United States Patent
Ryu et al.

(10) Patent No.: US 11,424,791 B2
(45) Date of Patent: Aug. 23, 2022

(54) MACHINE LEARNING MODEL SELECTION IN BEAMFORMED COMMUNICATIONS

(71) Applicant: QUALCOMM Incorporated, San Diego, CA (US)

(72) Inventors: Jung Ho Ryu, Fort Lee, NJ (US); Junyi Li, Franklin Park, NJ (US); Hua Wang, Basking Ridge, NJ (US); Tianyang Bai, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/229,334

(22) Filed: Apr. 13, 2021

(65) Prior Publication Data

US 2021/0328630 A1 Oct. 21, 2021

Related U.S. Application Data

(60) Provisional application No. 63/011,184, filed on Apr. 16, 2020.

(51) Int. Cl.
*H04B 7/0426* (2017.01)
*H04B 7/06* (2006.01)
*H04B 1/44* (2006.01)

(52) U.S. Cl.
CPC ............ *H04B 7/043* (2013.01); *H04B 1/44* (2013.01); *H04B 7/0632* (2013.01); *H04B 7/0695* (2013.01)

(58) Field of Classification Search
CPC ........ H04B 7/043; H04B 1/44; H04B 7/0632; H04B 7/0695; H04B 17/391;
(Continued)

(56) References Cited

U.S. PATENT DOCUMENTS 10,177,939 B2 * 1/2019 Seyama ............... H04B 7/0452
10,473,749 B1 * 11/2019 Baxley ................. H04B 17/318
(Continued)

FOREIGN PATENT DOCUMENTS

EP 3136775 A1 3/2017
EP 3310118 A1 4/2018
(Continued)

OTHER PUBLICATIONS

International Search Report and Written Opinion—PCT/US2021/027269—ISA/EPO—dated Jul. 13, 2021.

*Primary Examiner* — David S Huang
(74) *Attorney, Agent, or Firm* — Holland & Hart LLP/Qualcomm Incorporated

(57) ABSTRACT

Methods, systems, and devices for wireless communications are described in which a base station may develop a number of different predictive models for each of a number of different functions. The different functions may be used to determine various beamforming parameters for beamformed communications between a user equipment (UE) and a base station. The base station may provide the models to a UE, and the UE may then use such models to determine values for one or more beamforming parameters. A same function (e.g., a beam prediction function to identify a transmit/receive beam for communications) may have multiple different models, which may be provided to the UE by the base station, which may be used based on particular channel conditions or locations of a UE. The UE or base station may select which model of the multiple predictive models is to be used for communications.

38 Claims, 21 Drawing Sheets

(58) Field of Classification Search
CPC . H04B 7/0417; H04B 7/0617; H04L 25/0254; H04W 88/08; H04W 88/12; H04W 92/18
See application file for complete search history.

(56) References Cited

U.S. PATENT DOCUMENTS

| | | | |
|---|---|---|---|
| 2016/0034823 A1* | 2/2016 | Farkas | G06N 5/048 706/12 |
| 2019/0065951 A1 | 2/2019 | Luo et al. | |
| 2019/0356516 A1 | 11/2019 | Cao et al. | |
| 2019/0372644 A1 | 12/2019 | Chen et al. | |
| 2021/0160712 A1* | 5/2021 | Tadayon | H04W 16/24 |
| 2021/0273694 A1* | 9/2021 | Jana | H04B 7/0665 |
| 2021/0326701 A1 | 10/2021 | Bai | |
| 2021/0326726 A1 | 10/2021 | Wang | |

FOREIGN PATENT DOCUMENTS

| | | |
|---|---|---|
| WO | WO-2018149898 A2 | 8/2018 |
| WO | WO-2019190368 A1 | 10/2019 |
| WO | WO-2020005121 A1 | 1/2020 |
| WO | WO-2020032774 A1 | 2/2020 |
| WO | WO-2020043284 A1 | 3/2020 |
| WO | WO-2020064134 A1 | 4/2020 |

\* cited by examiner

MACHINE LEARNING MODEL SELECTION IN BEAMFORMED COMMUNICATIONS

CROSS REFERENCE

The present Application for Patent claims the benefit of U.S. Provisional Patent Application No. 63/011,184 by RYU et al., entitled "MACHINE LEARNING MODEL SELECTION IN BEAMFORMED COMMUNICATIONS," filed Apr. 16, 2020, assigned to the assignee hereof, and expressly incorporated by reference herein.

INTRODUCTION

The following relates generally to wireless communications and more specifically to managing beamformed communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a user equipment (UE) is described. The method may include receiving, from a base station, one or more predictive models for at least a first function associated with beamformed communications with the base station and communicating with the base station using beamformed communications that are based on one or more parameters, the one or more parameters based on a predictive model of the one or more predictive models for the first function for beamformed communications with the base station.

An apparatus for wireless communication at a UE is described. The apparatus may include a processor, memory coupled with the processor, the processor and memory configured to receive, from a base station, one or more predictive models for at least a first function associated with beamformed communications with the base station and communicate with the base station using beamformed communications that are based on one or more parameters, the one or more parameters based on a predictive model of the one or more predictive models for the first function for beamformed communications with the base station.

Another apparatus for wireless communication at a UE is described. The apparatus may include means for receiving, from a base station, one or more predictive models for at least a first function associated with beamformed communications with the base station and means for communicating with the base station using beamformed communications that are based on one or more parameters, the one or more parameters based on a predictive model of the one or more predictive models for the first function for beamformed communications with the base station.

A non-transitory computer-readable medium storing code for wireless communication at a UE is described. The code may include instructions executable by a processor to receive, from a base station, one or more predictive models for at least a first function associated with beamformed communications with the base station and communicate with the base station using beamformed communications that are based on one or more parameters, the one or more parameters based on a predictive model of the one or more predictive models for the first function for beamformed communications with the base station.

Some examples of the method, apparatuses, and non-transitory computer-readable medium described herein may further include operations, features, means, or instructions for measuring one or more channel conditions between the UE and the base station, transmitting, responsive to the measuring, a measurement report to the base station that indicates the one or more channel conditions, receiving, from the base station, an indication of the predictive model, and selecting the predictive model for the first function responsive to the indication from the base station. In some examples of the method, apparatuses, and non-transitory computer-readable medium described herein, the UE receives, from the base station, a prioritized list of predictive models to be used at the UE for each of a set of multiple functions associated with beamformed communications.

Some examples of the method, apparatuses, and non-transitory computer-readable medium described herein may further include operations, features, means, or instructions for determining whether the predictive model accurately predicts the first function and transmitting an indication to the base station based on the determining. In some examples of the method, apparatuses, and non-transitory computer-readable medium described herein, the measurement report further indicates position information of the UE. In some examples of the method, apparatuses, and non-transitory computer-readable medium described herein, the measuring may include operations, features, means, or instructions for measuring one or more reference signals received from the base station and one or more other base stations in one or more synchronization signal blocks (SSBs).

Some examples of the method, apparatuses, and non-transitory computer-readable medium described herein may further include operations, features, means, or instructions for transmitting one or more measurement reports to the base station based on measurements associated with the beamformed communications that used the predictive model for the first function, receiving, from the base station responsive to the one or more measurement reports, an indication to switch to a different predictive model of the one or more predictive models, determining one or more updated parameters for the further beamformed communications based on the different predictive model for the first function, and communicating with the base station using beamformed communications that may be based on the one or more updated parameters.

Some examples of the method, apparatuses, and non-transitory computer-readable medium described herein may further include operations, features, means, or instructions for receiving, from the base station, a model selection function for selecting a different predictive model and switching to the different predictive model of the one or more predictive models for the first function based on the model selection function. Some examples of the method, apparatuses, and non-transitory computer-readable medium described herein may further include operations, features, means, or instructions for measuring one or more channel conditions associated with the beamformed communications, one or more internal states of the UE, or combinations thereof, to identify a set of multiple measurements and providing the set of multiple measurements as inputs to the model selection function, and where the switching is performed responsive to an associated output of the model selection function based on the set of multiple measurements.

Some examples of the method, apparatuses, and non-transitory computer-readable medium described herein may further include operations, features, means, or instructions for computing, for each of two or more predictive models, an outcome of the first function to generate a two or more outcomes of the first function, determining that a first outcome of the two or more outcomes of the first function is a most preferred outcome, where the first outcome is associated with a first predictive model, and selecting the first predictive model based on the determining. Some examples of the method, apparatuses, and non-transitory computer-readable medium described herein may further include operations, features, means, or instructions for monitoring a prediction quality from the first predictive model over a set of multiple predictions and switching to a second predictive model for the first function based on the prediction quality from the first predictive model dropping below a threshold quality. In some examples of the method, apparatuses, and non-transitory computer-readable medium described herein, the prediction quality dropping below the threshold quality may be determined based on an outcome of the first predictive model not matching an observed outcome based on one or more measurements at the UE. In some examples of the method, apparatuses, and non-transitory computer-readable medium described herein, the prediction quality dropping below the threshold quality may be determined based on one or more of a number of consecutive incorrect predictions exceeding a threshold value, a number of incorrect predictions out of a set of past predictions exceeding the threshold value, or any combinations thereof.

A method for wireless communication at a base station is described. The method may include transmitting, to a first UE, one or more predictive models for at least a first function associated with beamformed communications with the first UE, the one or more predictive models based on the first UE being identified for beamformed communications with the base station and communicating with the first UE using beamformed communications parameters that are based on a predictive model of the one or more predictive models.

An apparatus for wireless communication at a base station is described. The apparatus may include a processor, memory coupled with the processor, the processor and memory configured to transmit, to a first UE, one or more predictive models for at least a first function associated with beamformed communications with the first UE, the one or more predictive models based on the first UE being identified for beamformed communications with the base station and communicate with the first UE using beamformed communications parameters that are based on a predictive model of the one or more predictive models.

Another apparatus for wireless communication at a base station is described. The apparatus may include means for transmitting, to a first UE, one or more predictive models for at least a first function associated with beamformed communications with the first UE, the one or more predictive models based on the first UE being identified for beamformed communications with the base station and means for communicating with the first UE using beamformed communications parameters that are based on a predictive model of the one or more predictive models.

A non-transitory computer-readable medium storing code for wireless communication at a base station is described. The code may include instructions executable by a processor to transmit, to a first UE, one or more predictive models for at least a first function associated with beamformed communications with the first UE, the one or more predictive models based on the first UE being identified for beamformed communications with the base station and communicate with the first UE using beamformed communications parameters that are based on a predictive model of the one or more predictive models.

Some examples of the method, apparatuses, and non-transitory computer-readable medium described herein may further include operations, features, means, or instructions for receiving, from the first UE, a measurement report that indicates one or more measured channel conditions at the first UE, selecting, based on the measurement report, the predictive model of the one or more predictive models for the beamformed communications with the first UE, and transmitting, to the first UE, an indication of the predictive model. In some examples of the method, apparatuses, and non-transitory computer-readable medium described herein, the transmitting the indication of the predictive model may include operations, features, means, or instructions for transmitting a prioritized list of predictive models to be used at the first UE for each of a set of multiple functions associated with the beamformed communications.

Some examples of the method, apparatuses, and non-transitory computer-readable medium described herein may further include operations, features, means, or instructions for receiving, from the first UE, an indication of whether the predictive model accurately predicts the first function and updating a model for determining which of the one or more predictive models to indicate to UEs based on measurement reports. In some examples of the method, apparatuses, and non-transitory computer-readable medium described herein, the measurement report further indicates position information of the first UE, and where the selecting is further based on the position information.

Some examples of the method, apparatuses, and non-transitory computer-readable medium described herein may further include operations, features, means, or instructions for receiving, from the first UE, one or more measurement reports indicating measurements associated with the beamformed communications that used the predictive model for the first function, determining, based on the one or more measurement reports, that the first UE is to be switched to a different predictive model of two or more predictive models, and transmitting, to the UE, an indication to switch to the different predictive model.

Some examples of the method, apparatuses, and non-transitory computer-readable medium described herein may further include operations, features, means, or instructions for transmitting, to the first UE, a model selection function for UE selection of a different predictive model. Some examples of the method, apparatuses, and non-transitory computer-readable medium described herein may further include operations, features, means, or instructions for configuring the first UE to select the predictive model from two or more predictive models based on outcomes of the first function for each of the two or more predictive models. In some examples of the method, apparatuses, and non-transitory computer-readable medium described herein, the configuring may include operations, features, means, or instructions for configuring a threshold prediction quality at the first UE to initiate a switch between predictive models. In some examples of the method, apparatuses, and non-transitory computer-readable medium described herein, the threshold prediction quality corresponds to a threshold value for a number of consecutive incorrect predictions, a number of incorrect predictions out of a set of past predictions exceeding the threshold value, or any combinations thereof.

A method of wireless communication at a UE is described. The method may include receiving, from a base station, a set of predictive models for at least a first function associated with beamformed communications with the base station, selecting a first predictive model of the set of predictive models for the first function for beamformed communications with the base station, determining one or more parameters for the beamformed communications based on the first predictive model for the first function, and communicating with the base station using beamformed communications that are based on the one or more determined parameters.

An apparatus for wireless communication at a UE is described. The apparatus may include a processor, memory coupled with the processor, the processor and memory configured to receive, from a base station, a set of predictive models for at least a first function associated with beamformed communications with the base station, select a first predictive model of the set of predictive models for the first function for beamformed communications with the base station, determine one or more parameters for the beamformed communications based on the first predictive model for the first function, and communicate with the base station using beamformed communications that are based on the one or more determined parameters.

Another apparatus for wireless communication at a UE is described. The apparatus may include means for receiving, from a base station, a set of predictive models for at least a first function associated with beamformed communications with the base station, selecting a first predictive model of the set of predictive models for the first function for beamformed communications with the base station, determining one or more parameters for the beamformed communications based on the first predictive model for the first function, and communicating with the base station using beamformed communications that are based on the one or more determined parameters.

A non-transitory computer-readable medium storing code for wireless communication at a UE is described. The code may include instructions executable by a processor to receive, from a base station, a set of predictive models for at least a first function associated with beamformed communications with the base station, select a first predictive model of the set of predictive models for the first function for beamformed communications with the base station, determine one or more parameters for the beamformed communications based on the first predictive model for the first function, and communicate with the base station using beamformed communications that are based on the one or more determined parameters.

In some examples of the method, apparatuses, and non-transitory computer-readable medium described herein, the selecting may include operations, features, means, or instructions for measuring one or more channel conditions between the UE and the base station, transmitting, responsive to the measuring, a measurement report to the base station that indicates the one or more channel conditions, receiving, from the base station, an indication of the first predictive model, and selecting the first predictive model for the first function responsive to the indication from the base station.

In some examples of the method, apparatuses, and non-transitory computer-readable medium described herein, the UE receives, from the base station, a prioritized list of predictive models to be used at the UE for each of a set of functions associated with beamformed communications. In some examples of the method, apparatuses, and non-transitory computer-readable medium described herein, the measuring may include operations, features, means, or instructions for measuring one or more reference signals received from the base station and one or more other base stations in one or more synchronization signal blocks (SSBs). In some examples of the method, apparatuses, and non-transitory computer-readable medium described herein, the measurement report further indicates position information of the UE.

Some examples of the method, apparatuses, and non-transitory computer-readable medium described herein may further include operations, features, means, or instructions for determining whether the first predictive model accurately predicts the first function, and transmitting an indication to the base station based on the determining. In some examples of the method, apparatuses, and non-transitory computer-readable medium described herein, the selecting may include operations, features, means, or instructions for computing, for each of the set of predictive models, an outcome of the first function to generate a set of outcomes of the first function, determining that a first outcome of the set of outcomes of the first function may be a most preferred outcome of the set of outcomes, where the first outcome is associated with the first predictive model, and selecting the first predictive model based on the determining.

Some examples of the method, apparatuses, and non-transitory computer-readable medium described herein may further include operations, features, means, or instructions for monitoring a prediction quality from the first predictive model over a set of predictions, and switching to a second predictive model for the first function based on the prediction quality from the first predictive model dropping below a threshold quality. In some examples of the method, apparatuses, and non-transitory computer-readable medium described herein, the prediction quality dropping below the threshold quality determined based on an outcome of the first predictive model not matching an observed outcome based on one or more measurements at the UE. In some examples of the method, apparatuses, and non-transitory computer-readable medium described herein, the prediction quality dropping below the threshold quality may be determined based on one or more of a number of consecutive incorrect predictions exceeding a threshold value, a number of incorrect predictions out of a set of past predictions exceeding the threshold value, or any combinations thereof.

Some examples of the method, apparatuses, and non-transitory computer-readable medium described herein may further include operations, features, means, or instructions for transmitting one or more measurement reports to the base station based on measurements associated with the beamformed communications that used the first predictive model for the first function, receiving, from the base station responsive to the one or more measurement reports, an indication to switch to a second predictive model of the set of predictive models, determining one or more updated parameters for the further beamformed communications based on the second predictive model for the first function, and communicating with the base station using beamformed communications that is based on the one or more updated parameters.

Some examples of the method, apparatuses, and non-transitory computer-readable medium described herein may further include operations, features, means, or instructions for receiving, from the base station, a model selection function for selecting a different predictive model, and switching from the first predictive model to a second predictive model of the set of predictive models for the first function based on the model selection function. Some examples of the method, apparatuses, and non-transitory computer-readable medium described herein may further include operations, features, means, or instructions for measuring one or more channel conditions associated with the beamformed communications, one or more internal states of the UE, or combinations thereof, to identify a set of measurements, and providing the set of measurements as inputs to the model selection function, and where the switching is performed responsive to an associated output of the model selection function based on the set of measurements.

A method of wireless communication at a base station is described. The method may include identifying a set of predictive models for at least a first function associated with beamformed communications between the base station and a UE, transmitting, to a first UE, the set of predictive models based on the first UE being identified for beamformed communications with the base station, and communicating with the first UE using beamformed communications that are based on one or more parameters of the first function that are determined based on a first predictive model of the set of predictive models.

An apparatus for wireless communication at a base station is described. The apparatus may include a processor, memory coupled with the processor, the processor and memory configured to identify a set of predictive models for at least a first function associated with beamformed communications between the base station and a UE, transmit, to a first UE, the set of predictive models based on the first UE being identified for beamformed communications with the base station, and communicate with the first UE using beamformed communications that are based on one or more parameters of the first function that are determined based on a first predictive model of the set of predictive models.

Another apparatus for wireless communication at a base station is described. The apparatus may include means for identifying a set of predictive models for at least a first function associated with beamformed communications between the base station and a UE, transmitting, to a first UE, the set of predictive models based on the first UE being identified for beamformed communications with the base station, and communicating with the first UE using beamformed communications that are based on one or more parameters of the first function that are determined based on a first predictive model of the set of predictive models.

A non-transitory computer-readable medium storing code for wireless communication at a base station is described. The code may include instructions executable by a processor to identify a set of predictive models for at least a first function associated with beamformed communications between the base station and a UE, transmit, to a first UE, the set of predictive models based on the first UE being identified for beamformed communications with the base station, and communicate with the first UE using beamformed communications that are based on one or more parameters of the first function that are determined based on a first predictive model of the set of predictive models.

Some examples of the method, apparatuses, and non-transitory computer-readable medium described herein may further include operations, features, means, or instructions for receiving, from the first UE, a measurement report that indicates one or more measured channel conditions at the first UE, selecting, based on the measurement report, the first predictive model of the set of predictive models for the beamformed communications with the first UE, and transmitting, to the first UE, an indication of the first predictive model.

In some examples of the method, apparatuses, and non-transitory computer-readable medium described herein, the transmitting the indication of the first predictive model may include operations, features, means, or instructions for transmitting a prioritized list of predictive models to be used at the first UE for each of a set of functions associated with the beamformed communications. In some examples of the method, apparatuses, and non-transitory computer-readable medium described herein, the measurement report further indicates position information of the first UE, and where the selecting is further based on the position information.

Some examples of the method, apparatuses, and non-transitory computer-readable medium described herein may further include operations, features, means, or instructions for receiving, from the first UE, an indication of whether the first predictive model accurately predicts the first function, and updating a model for determining which of the set of predictive models to indicate to UEs based on measurement reports. Some examples of the method, apparatuses, and non-transitory computer-readable medium described herein may further include operations, features, means, or instructions for configuring the first UE to select the first predictive model from the set of predictive models based on outcomes of the first function for each of the set of predictive models.

Some examples of the method, apparatuses, and non-transitory computer-readable medium described herein may further include operations, features, means, or instructions for configuring a threshold prediction quality at the first UE to initiate a switch between predictive models. In some examples of the method, apparatuses, and non-transitory computer-readable medium described herein, the threshold quality corresponds to a threshold value for a number of consecutive incorrect predictions, a number of incorrect predictions out of a set of past predictions exceeding the threshold value, or any combinations thereof.

Some examples of the method, apparatuses, and non-transitory computer-readable medium described herein may further include operations, features, means, or instructions for receiving, from the first UE, one or more measurement reports indicating measurements associated with the beamformed communications that used the first predictive model for the first function, determining, based on the one or more measurement reports, that the first UE is to be switched to a second predictive model of the set of predictive models, and transmitting, to the UE, an indication to switch to the second predictive model. Some examples of the method, apparatuses, and non-transitory computer-readable medium described herein may further include operations, features, means, or instructions for transmitting, to the first UE, a model selection function for UE selection of a different predictive model of the set of predictive models.

DETAILED DESCRIPTION

Figure 1:
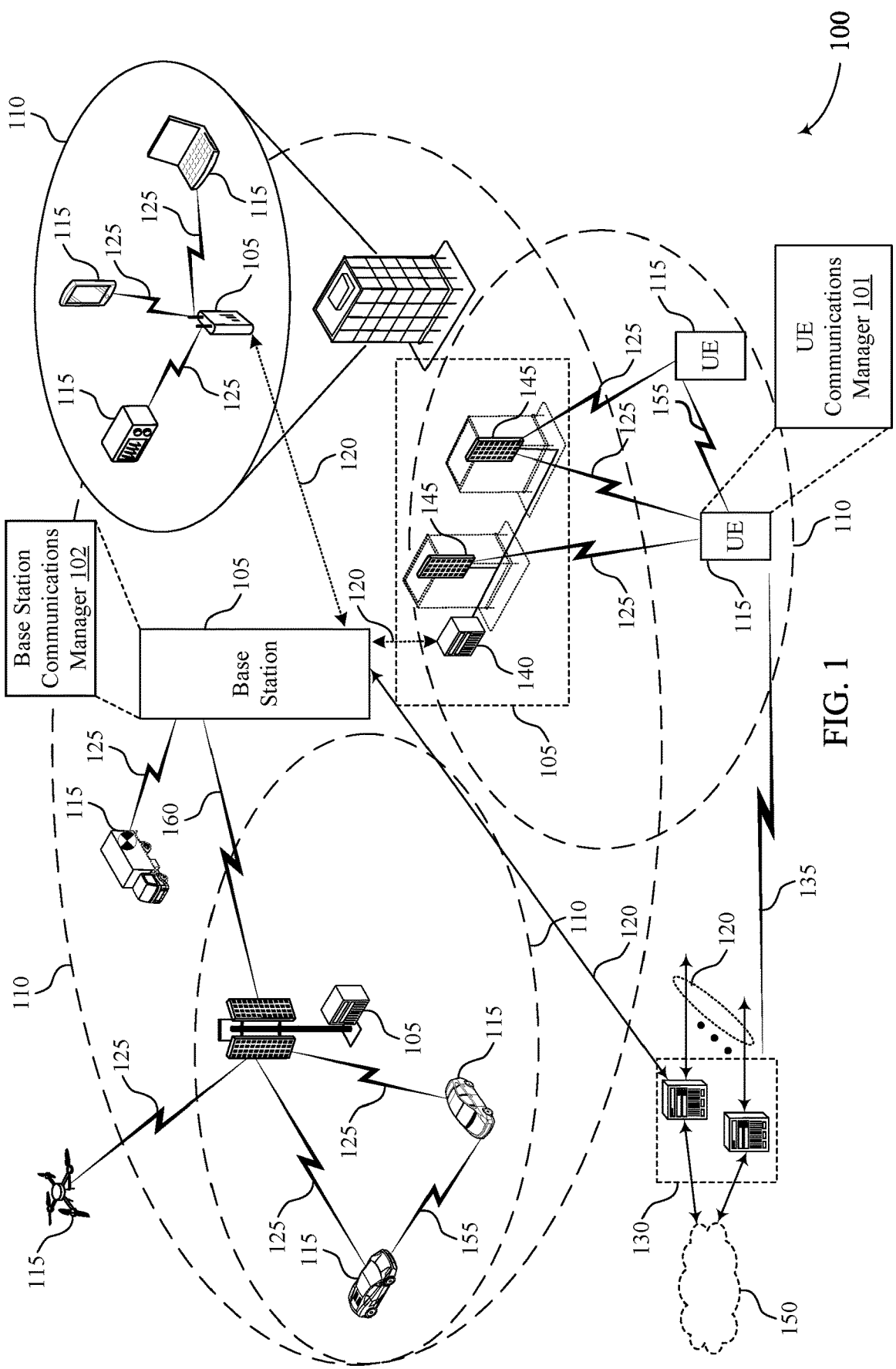
FIG. 1 illustrates an example of a system for wireless communications that supports machine learning model selection in beamformed communications in accordance with aspects of the present disclosure.

In some deployments, wireless communications systems may operate in millimeter wave (mmW) frequency ranges (e.g., 24 GHz, 26 GHz, 28 GHz, 39 GHz, 52.6-71 GHz, etc.). Wireless communications at these frequencies may be associated with increased signal attenuation (e.g., path loss, penetration loss, blockage loss), which may be influenced by various factors, such as diffraction, propagation environment, density of blockages, material properties, etc. As a result, signal processing techniques, such as beamforming, may be used to coherently combine energy and overcome the path losses at these frequencies. Due to the increased amount of path, penetration and blockage losses in mmW communications systems, transmissions between wireless devices (e.g., from a base station and/or a user equipment (UE)) may be beamformed. Moreover, a receiving device may use beamforming techniques to configure antenna(s) and/or antenna array(s) and/or antenna array module(s) such that transmissions are received in a directional manner.

In order to identify suitable beamforming parameters UEs and base stations may perform beam training procedures to identify suitable beams for communications and associated beamforming parameters. For example, a base station may transmit a number of beams in a beam sweeping procedure, and a UE may measure received signals to identify a preferred beam, and the base station and UE may proceed to establish a beam pair link. Further, when using beamformed communications, various other parameters may be identified and used for communications, such as channel property parameters including delay spread, connectivity parameters for identifying when to handover a UE between base stations, and the like.

In accordance with various techniques discussed herein, a base station may develop a number of different predictive models for each of a number of different functions that may be used to determine various beamforming parameters. For example, multiple neural network (NN), artificial intelligence (AI), or machine learning (ML) models may be generated for each of multiple different functions. The base station may provide the models to a UE, and the UE may then use such models to determine values (e.g., initial values) for one or more beamforming parameters. Further, in some cases, for a same function (e.g., a beam prediction function to identify a transmit/receive beam for communications) may have multiple different models, which may be provided to the UE by a base station. Such different models for a same function may be used based on particular channel conditions or locations of a UE. For example, a first model that predicts a delay spread channel property may provide a good fit and prediction when the UE is relatively close to the base station, and a second model may provide a better fit and prediction when the UE is relatively far away from the base station. Some of the functions may be, for example, beam prediction functions (e.g., which transmit/receive beam to use for communications at the UE and base station), channel property predictions (e.g., predicted delay spread values), connectivity predictions (e.g., when to perform a handover between different base stations, and which base station to select for a given channel condition and/or location), and the like. In some cases, a number of different models may be provided for each function, and one model may be selected and used for communications in accordance with various techniques such as discussed herein. Further, in cases where a UE is in a changing channel environment (e.g., due to movement of the UE), the UE may update its models in order to appropriately match the current channel environment in accordance with techniques such as discussed herein.

In some cases, the base station may provide a number of different models for each of a number of different functions, and may assist the UE in model selection. For example, a UE may measure a channel between the UE and a serving base station or cell, and optionally one or more other base stations or cells from which the UE can receive a signal, and use the channel measurements for model selection. Such measurements may be made based on periodic synchronization signal blocks (SSBs) transmitted by base stations, and the UE may measure any detected SSBs from a serving base station or other base stations. Further, in some cases, the UE may measure its position (e.g., based on global positioning system (GPS) measurements, indoor positioning measurements, or combinations thereof), which may be provided as an input to one or more models or used to help in model selection. The UE, in some cases, may transmit one or more measurement reports to the serving base station that may provide the measured channel conditions, positioning information, or combinations thereof. In response to the measurement report, the serving base station may provide the UE with a prioritized list of predictive models to be used by the UE for each functionality (e.g., based on which models provide better results for the UE functions based on the UE measurement report). In some cases, the UE may provide feedback to the base station related to the accuracy of the prediction of the model indicated by the base station, which may be used by the base station to update recommendations for future indications of which model to select.

In some cases, the UE may receive a number of models for a number of functions, and the UE may determine which to select for communications. In some cases, the UE may determine an outcome for each model and, based on the initial result, the UE may select the best one to use. Further, the UE may monitor the prediction quality of the selected model, and switch to a different model if a prediction quality drops below a threshold value. For example, if a predictive model indicates that a different base station will provide better link, the UE can request that the other base station transmit a synchronization signal in order to find a beam pair. If the outcome of the action does not result in the predicted outcome (e.g., is a suitable beam pair with the other base station was not identified), then that prediction was bad, and otherwise the prediction was good. In some cases, if the current predictive model gives a consecutive number of bad predictions that exceeds a threshold value, or if n bad predictions out of the past m predictions are observed, the UE may switch to a different predictive model.

Further, in some cases the UE may update its predictive models based on the current channel environment observed at the UE. In such cases, the UE may measure channel characteristics between it and its serving base station, and transmit corresponding measurement reports to the base station. Based on the measurement reports, the base station may send an update to the UE to use a different predictive model, which the UE may use to update the model and any associated parameters. Additionally or alternatively, in some cases the base station may provide a model selection function that may be used at the UE to update its models. The UE in such cases may make measurements of the channel, or of its internal states (e.g., gyroscopic measurements that may indicate to switch antenna panels), that are provided to the model selection function. The model selection function may then output updates to apply to the UE's predictive models.

Such techniques may be useful to indicate predictive models to a UE, which may be used to determine one or more beamforming parameters for communications between the UE and a base station. Such predictive models may allow for more efficient determination of communications parameters with fewer iterations to determine a suitable parameter, and thus enhance the efficiency of communications. Thus, providing predictive models and indications of a model to use at a UE may provide enhanced efficiency and reliability.

Aspects of the disclosure are initially described in the context of wireless communications systems. Aspects of the disclosure are further illustrated by and described with reference to process flows, apparatus diagrams, system diagrams, and flowcharts that relate to machine learning model selection in beamformed communications.

FIG. 1 illustrates an example of a wireless communications system 100 that supports machine learning model selection in beamformed communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, repeater devices, customer premises equipment (CPE), integrated access and backhaul (IAB) nodes, router devices, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. In some examples, the one or more base stations 105 may provide backhaul connectivity between another base station 105 and core network 130 via a backhaul link 160 while acting as an IAB node.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays, routers, or CPE, as well as the base stations 105 and the network equipment including macro eNBs or gNBs, small cell eNBs or gNBs, IAB nodes, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 MegaHertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-s-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

UEs 115 in some aspects of the present disclosure may use beamforming in mmW communications via one or more uplink beams and one or more downlink beams. A UE communications manager 101 may receive a number of predictive models from a base station 105, and may select one of the predictive models to determine one or more communications parameters for beamformed communications. In some cases, the UE communications manager 101 may select a predictive model based on an indication from the base station 105. In other cases, the UE communications manager 101 may determine an output of each predictive model, and select the model which has a best or suitable output. The UE communications manager 101 may be an example of a communications manager 910 of FIG. 9.

One or more of the base stations 105 may include a base station communications manager 102. The base station communications manager 102 may identify multiple predictive models for a number of functions for beamformed communications with a UE 115. The base station communications manager 102 may provide the multiple predictive models to the UE 115 for use in determining one or more beamforming parameters for beamformed communications. In some cases, the base station communications manager 102 may receive one or more measurement reports from a UE 115, and select one of the predictive models for a function, and provide an indication of the selected model to the UE 115. The base station communications manager 102 may be an example of a communications manager 1310 of FIG. 13.

Figure 2:
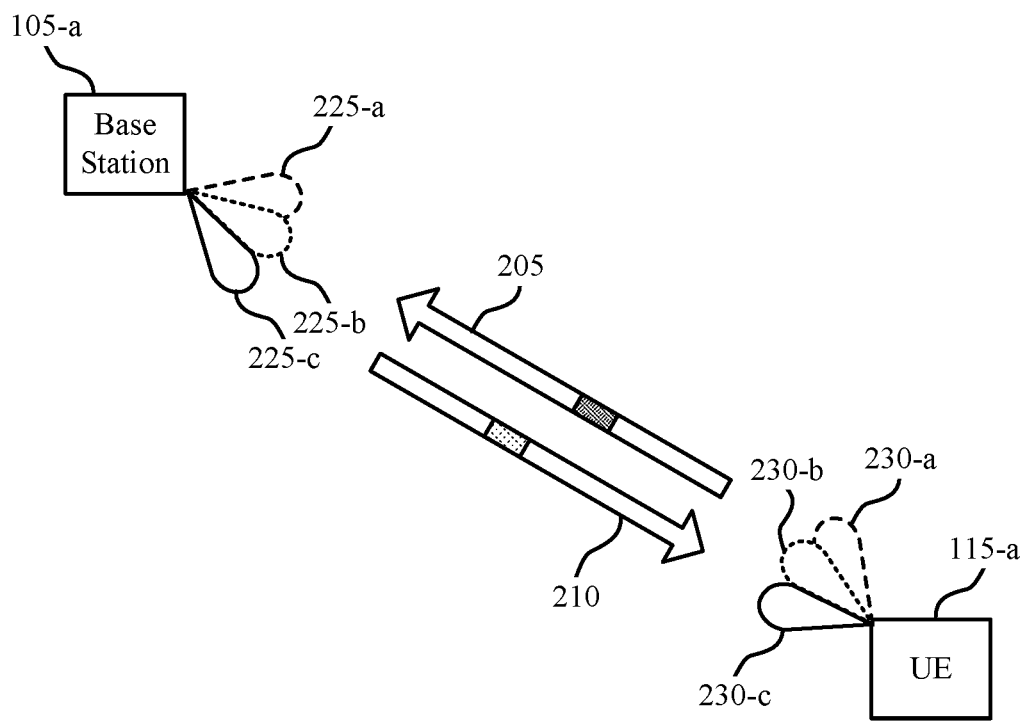
FIG. 2 illustrates an example of a portion of a wireless communications system that supports machine learning model selection in beamformed communications in accordance with aspects of the present disclosure.
Figure 2:
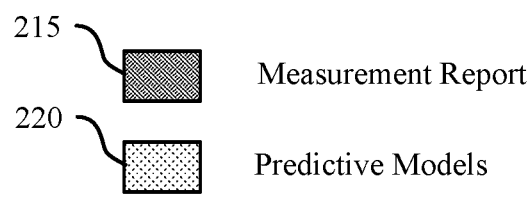

FIG. 2 illustrates an example of a portion of a wireless communications system 200 that supports machine learning model selection in beamformed communications in accordance with aspects of the present disclosure. In some examples, wireless communications system 200 may implement aspects of wireless communications system 100. In some examples, the wireless communications system 200 may include a UE 115-a, and a base station 105-a which may be examples of UEs 115 and base stations 105 described with reference to FIG. 1. The UE 115-a and base station 105-a may communicate using beamformed communications in which the UE 115-a transmits uplink communications 205 to the base station 105-a, and the base station 105-a transmits downlink communications 210 to the UE 115-a.

In some cases, the UE 115-a and base station 105-a may establish a connection in which the uplink communications 205 use an uplink beam and the downlink communications 210 use a downlink beam. The uplink and downlink beams may be established using a beam training procedure, where different base station beams 225 and different UE beams 230 may be tested and measured to identify preferred beams for communications. In some cases, one or more functions associated with beamformed communications may use a predictive model to predict one or more parameters for communications. In some cases, the base station 105-*a* may generate a number of different predictive models 220 based on a history of parameters that have been identified to provide reliable communications, and provide some or all of the predictive models 220 to the UE 115-*a* (e.g., in RRC signaling). For example, the base station 105-*a* may use NN, AI, or ML to generate the predictive models 220, and when the UE 115-*a* comes into a coverage area of the base station 105-*a* the predictive models 220 may be provided to the UE 115-*a* in order to enhance the efficiency for determining suitable parameters for communications.

Figure 3:
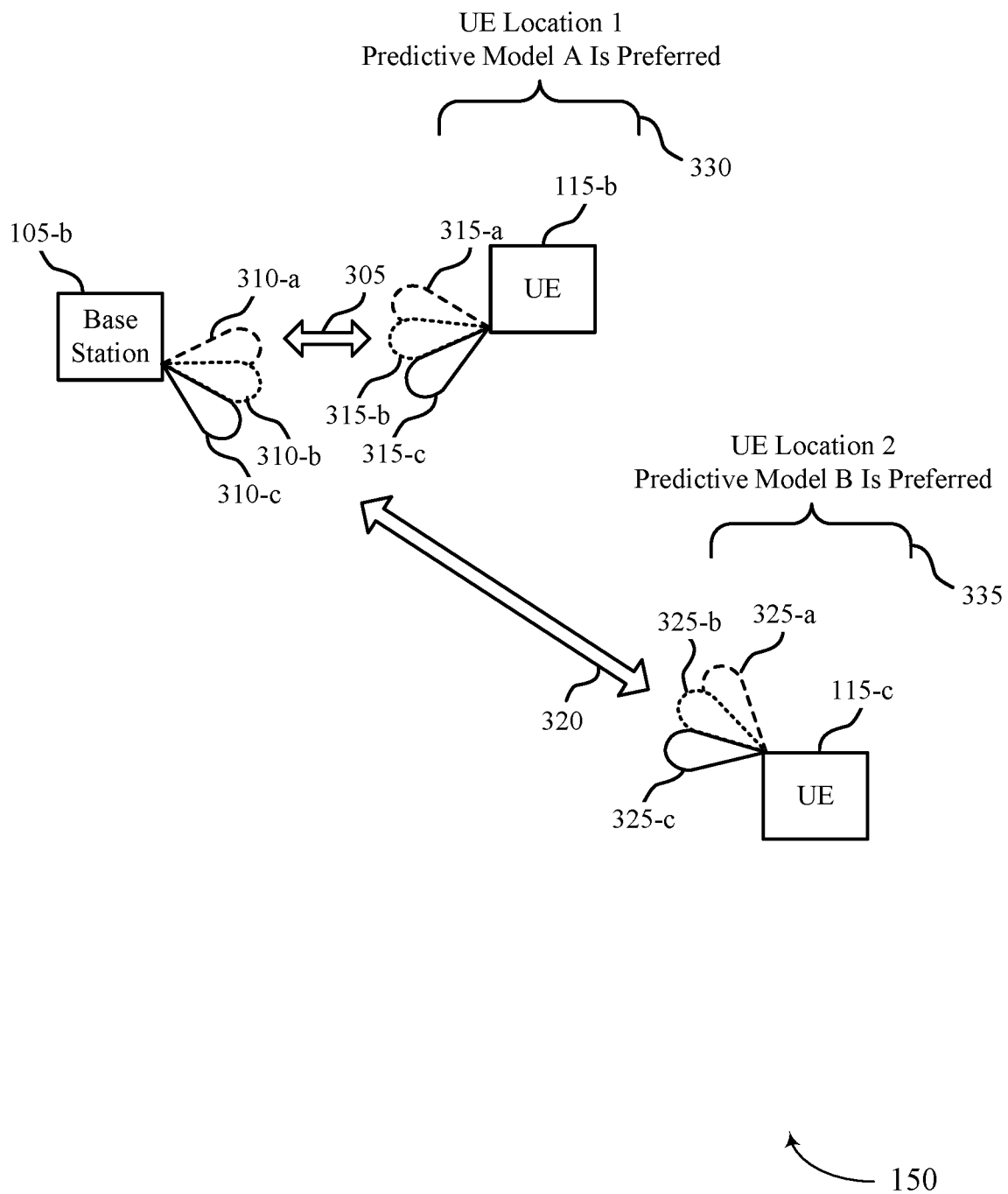
FIG. 3 illustrates another example of a portion of a wireless communications system that supports machine learning model selection in beamformed communications in accordance with aspects of the present disclosure.

In some cases, the UE 115-*a* may perform measurements on one or more reference signals (e.g., in one or more SSBs) transmitted by the base station 105-*a*, and the UE 115-*a* may transmit a measurement report 215 to the base station 105-*a*. In some cases, based on the measurement report, the base station 105-*a* may select which predictive models 220 to provide to the UE 115-*a*, may select which predictive model should be used at the UE 115-*a*, or any combinations thereof. For example, one a first predictive model may be more suitable in cases where the UE 115-*a* is located relatively close to the base station 105-*a*, and a second predictive model may be more suitable in cases where the UE 115-*a* is located further away from the base station 105-*a*. FIG. 3 illustrates an example of such a case.

FIG. 3 illustrates an example of a wireless communications system 300 that supports machine learning model selection in beamformed communications in accordance with aspects of the present disclosure. In some examples, wireless communications system 300 may implement aspects of wireless communications system 100 or 200. In some examples, the wireless communications system 300 may include a first UE 115-*b*, a second UE 115-*a*, and a base station 105-*b* which may be examples of UEs 115 and base stations 105 described with reference to FIGS. 1 and 2.

In this example, the first UE 115-*b* and base station 105-*b* may communicate using beamformed communications 305 via an associated uplink beam and downlink beam. The uplink and downlink beams may be established using a beam training procedure, where different base station beams 310 and different UE beams 315 may be tested and measured to identify preferred beams for communications. Similarly, the second UE 115-*c* and the base station 105-*b* may communicate using beamformed communications 320 via an associated uplink beam and downlink beam that are also established using a beam training procedure, where the different base station beams 310 and different UE beams 325 may be tested and measured to identify preferred beams for communications.

As discussed herein, one or more functions associated with beamformed communications may use a predictive model to predict one or more parameters for communications. In some cases, a particular function may have multiple predictive models, in which certain models may be better suited for certain channel conditions. In the example of FIG. 3, the first UE 115-*b* may be at a first location 330 in which a first predictive model for a first function is preferred, and the second UE 115-*c* may be at a second location 335 in which a second predictive model for the first function is preferred. In such cases, the base station 105-*b* may provide information that the UEs 115 may use to select the appropriate predictive model.

In some cases, the base station 105-*b* may provide multiple predictive models for the first function to each UE 115, and then provide an indication to each UE 115 of which model to select (e.g., based on a measurement report from the UEs 115). For example, the first UE 115-*b* may measure a relatively high reference signal received power (RSRP), which may indicate that the UE 115-*b* is relatively close to the base station 105-*b*. Based on the proximity to the base station 105-*b*, the first predictive model for the first function may be selected, such as a first predictive model for a delay spread function that is based on a relatively close proximity to the base station 105-*b*. Further, in this case, the second UE 115-*c* may measure a relatively low RSRP that may indicate that the second UE 115-*c* is relatively far from the base station, where the second predictive model for the delay function may provide better modeling for determination of a delay spread parameter at the second UE 115-*c*. In some cases, the base station 105-*b* may indicate the model selection directly by an identification of the model (e.g., an index value of the model that is provided to the UEs 115 in RRC signaling, in downlink control information (DCI), in a medium access control (MAC) control element (CE), or combinations thereof). In other cases, the base station 105-*b* may provide a prioritized list of models to each UE 115 that may be used to select the appropriate model.

In still other cases, each UE 115 may determine which predictive model to select by generating an output of the function for each model and identifying which provides a best output, which the model providing the best output selected at the UE 115. Additionally or alternatively, the base station 105-*b* may provide a model selection function to the UEs 115, which the UEs 115 may use to select the appropriate model, or to switch between models based on changing UE 115 conditions such as, for example, changed channel conditions due to mobility, changed locations as determined by a positioning function at the UEs 115, changed UE 115 orientation as determined by a gyro (e.g., that may indicate that a different antenna panel is more suitable for communications), or any combinations thereof.

Figure 4:
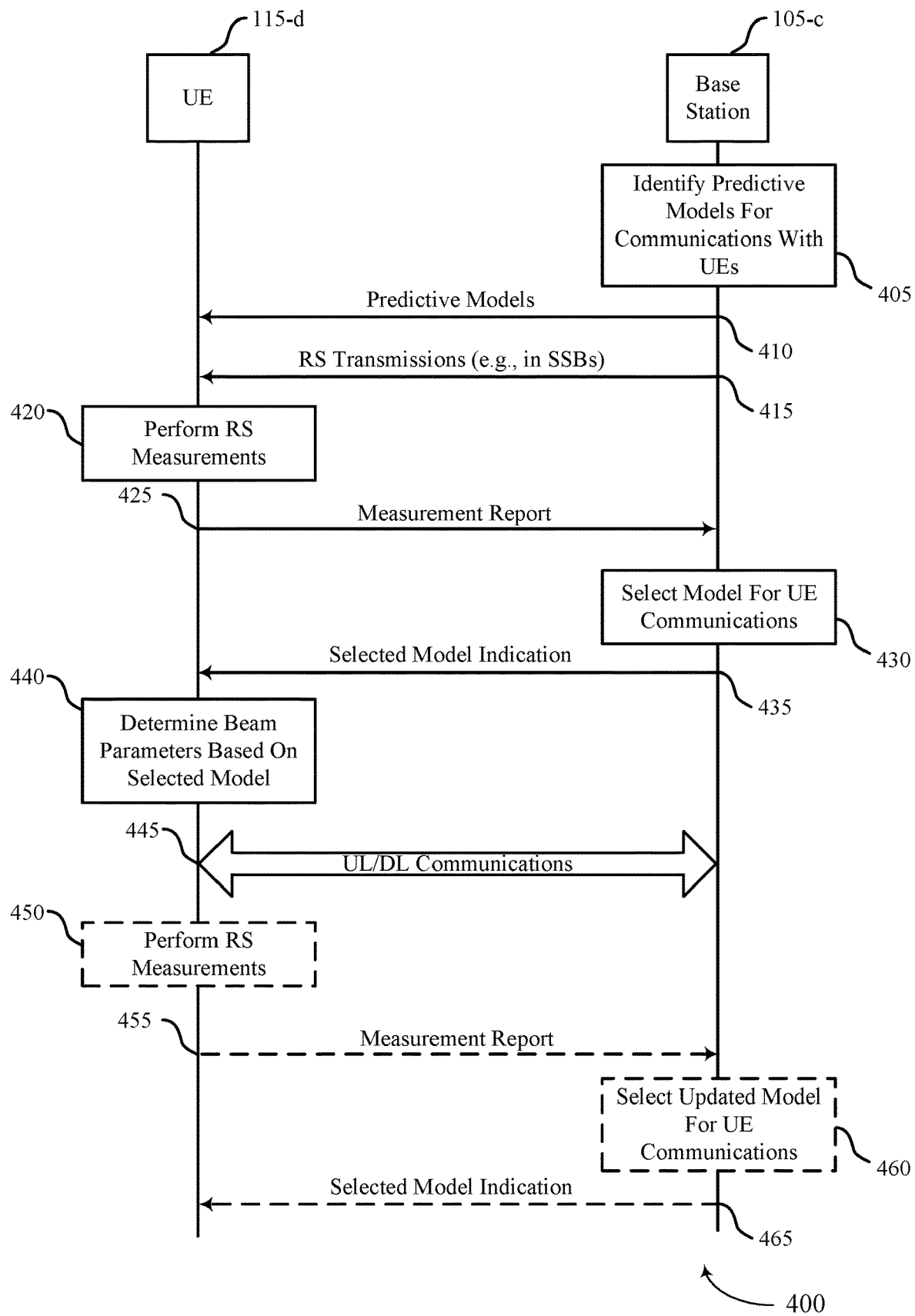
FIGS. 4 and 5 illustrate examples of process flows that support machine learning model selection in beamformed communications in accordance with aspects of the present disclosure.

FIG. 4 illustrates an example of a process flow 400 that supports machine learning model selection in beamformed communications in accordance with aspects of the present disclosure. In some examples, process flow 400 may implement aspects of wireless communications system 100, 200, or 300. Process flow 400 may be implemented by a UE 115-*d* and a base station 105-*c* as described herein. In the following description of the process flow 400, the communications between the UE 115-*d* and the base station 105-*c* may be transmitted in a different order than the example order shown, or the operations performed by the UE 115-*d* and base station 105-*c* may be performed in different orders or at different times. Some operations may also be omitted from the process flow 400, and other operations may be added to the process flow 400.

At 405, the base station 105-*c* may identify a number of different predictive models for multiple different functions for communications with UEs. In some cases, the base station 105-*c* may collect data from communications with multiple UEs to generate predictive models for the multiple functions using NN techniques, AI techniques, ML techniques, or combinations thereof. For example, the base station 105-*a*, based on measurement reports provided by UEs, may generate a predictive model for when a UE should be handed over to a different base station, and which base station in such cases. In some cases, the base station 105-*c* may generate multiple different predictive models for a particular function (e.g., the base station 105-*c* may generate different predictive models for delay spread based on UE RSRP and position information). In some cases, predictive models may be generated for a number of different functions, such as beam prediction functions (e.g., what transmit/receive beams to use for communications), channel property prediction functions (e.g., what will a delay spread be for communications), connectivity prediction functions (e.g., when to handover between base stations, which base station to receive a handover, etc.).

At 410, the base station 105-c may transmit the predictive models to the UE 115-d. In some cases, the predictive models may be transmitted to the UE 115-c in RRC signaling. Additionally or alternatively, the predictive models may be transmitted in one or more broadcast or unicast communications to the UE 115-d. At 415, the base station 105-c may transmit one or more reference signal transmissions (e.g., in one or more SSBs), which may be used by the UE 115-d for channel measurements. At 420, the UE 115-d may perform reference signal measurements of the reference signals transmitted by the base station 105-c, and in some cases may measure reference signals from one or more other base stations that may be in proximity to the UE 115-d. At 425, the UE 115-d may transmit a measurement report to the base station 105-c that includes values for various reference signal measurements made at the UE 115-d. In this example, the UE 115-d may rely on the base station 105-c for model selection and indication.

At 430, the base station 105-c may select a model for UE 115-d communications. Such selection may be made based on the one or more measurement reports received from the UE 115-d. At 435, the base station 105-c may transmit an indication of the selected model to the UE 115-d. In some cases, the predictive models provided to the UE 115-d may each have an associated identifier (e.g., an index value that is provided when the predictive models are transmitted to the UE 115-d), and the indication of the selected model may provide the identifier associated with the selected model. In other cases, the indication of the selected model may be provided by a prioritized list of predictive models, that the UE 115-d may use to determine which model to use.

At 440, the UE 115-d may determine one or more beam parameters based on the selected predictive model. In some cases, the selected predictive model may be used to determine values (e.g., initial values) for one or more beamforming parameters. Further, in some cases, for a same function (e.g., a beam prediction function to identify a transmit/ receive beam for communications) may have multiple different models, which may be provided to the UE 115-d by the base station 105-c. Such different models for a same function may be used based on particular channel conditions or locations of a UE 115-d. At 445, the UE 115-d and base station 105-c may communicate uplink and downlink communications based on beamforming parameters provided by the one or more models.

Optionally, at 450, the UE 115-d may perform further reference signal measurements of reference signals transmitted by the base station 105-c (e.g., reference signals provided with downlink communications or transmitted in SSBs, etc.). At 455, the UE 115-d may optionally transmit a further measurement report to the base station 105-c. The base station 105-c may use the measurement report for further data points in the NN/AI/ML techniques to tune the predictive models, in some cases. Further, at 460, the base station 105-c may optionally use the further measurement report to select an updated model for UE communications. For example, if the further measurement report indicates a UE 115-d position has changed, the base station 105-c may determine that a different model for delay spread is more suitable. At 465, the base station 105-c may transmit an indication of the selected model to the UE 115-d, which the UE 115-d may use for subsequent communications.

Figure 5:
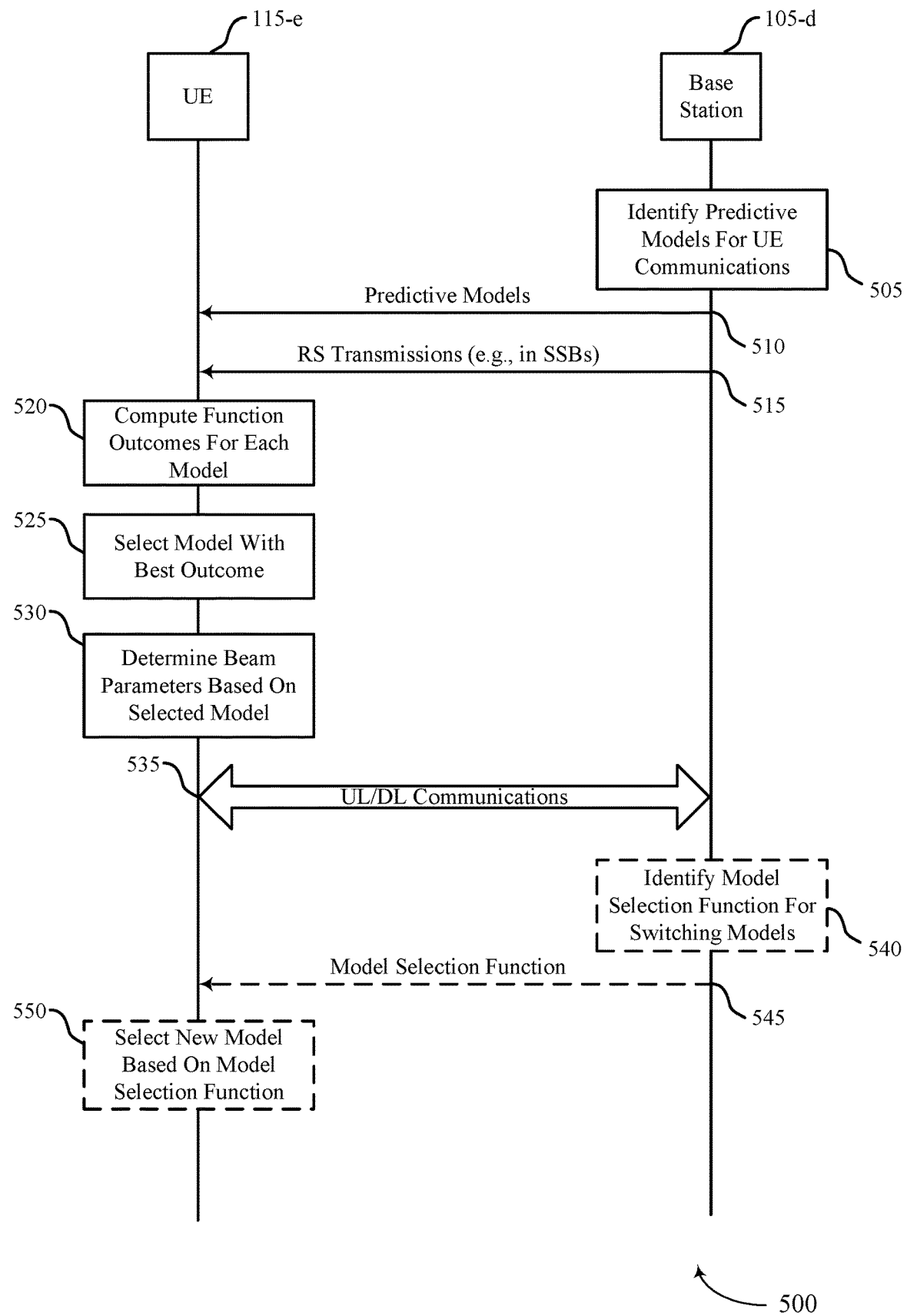

FIG. 5 illustrates an example of a process flow 500 that supports machine learning model selection in beamformed communications in accordance with aspects of the present disclosure. In some examples, process flow 500 may implement aspects of wireless communications system 100, 200, or 300. Process flow 500 may be implemented by a UE 115-e and a base station 105-d as described herein. In the following description of the process flow 500, the communications between the UE 115-e and the base station 105-d may be transmitted in a different order than the example order shown, or the operations performed by the UE 115-e and base station 105-d may be performed in different orders or at different times. Some operations may also be omitted from the process flow 500, and other operations may be added to the process flow 500.

At 505, the base station 105-d may identify a number of different predictive models for multiple different functions for communications with UEs, according to techniques such as discussed herein. At 510, the base station 105-d may transmit the predictive models to the UE 115-e. In some cases, the predictive models may be transmitted to the UE 115-e in RRC signaling. Additionally or alternatively, the predictive models may be transmitted in one or more broadcast or unicast communications to the UE 115-e. At 515, the base station 105-d may transmit one or more reference signal transmissions (e.g., in one or more SSBs), which may be used by the UE 115-e for channel measurements.

In this example, the UE 115-e may select which model to use, and at 520 may compute output functions for each predictive model that was provided by the base station 105-e. At 525, the UE 115-e may select a model for communications based on which model had the best, or a suitable, outcome when the output functions were computed. In some cases, the predictive models may be provided to the UE 115-e with a prioritized list that may be used in the selection of the model to use.

At 530, the UE 115-e may determine one or more beam parameters based on the selected predictive model. In some cases, the selected predictive model may be used to determine values (e.g., initial values) for one or more beamforming parameters. Further, in some cases, for a same function (e.g., a beam prediction function to identify a transmit/ receive beam for communications) may have multiple different models, which may be provided to the UE 115-e by the base station 105-d. Such different models for a same function may be used based on particular channel conditions or locations of a UE 115-e. At 535, the UE 115-e and base station 105-d may communicate uplink and downlink communications based on beamforming parameters provided by the one or more models.

Optionally, at 540, the base station 105-d may identify a model selection function for switching among different predictive models. At 545, the base station 105-d may transmit the model selection function to the UE 115-e. While the operations of 540 and 545 are illustrated as occurring subsequent to uplink and downlink communications, in some cases such a model selection function may be provided along with the predictive models that are provided to the UE 115-e by the base station 105-d. At 550, the UE 115-e may select a new model based on the model selection function, which may then be used for subsequent communications. In some cases, the UE 115-e may provide one or more measurements as inputs to the model selection function, which may output an updated model for UE communications. For example, if the measurement indicates a UE 115-e position has changed, the model selection function may determine that a different model for delay spread is more suitable, and may output an indication that the UE 115-*e* is to switch the associated model. Such techniques may allow a UE 115-*e* to account for a changing channel environment (e.g., due to movement of the UE 115-*e*), by UE updating its models in order to appropriately match the current channel environment.

Figure 6:
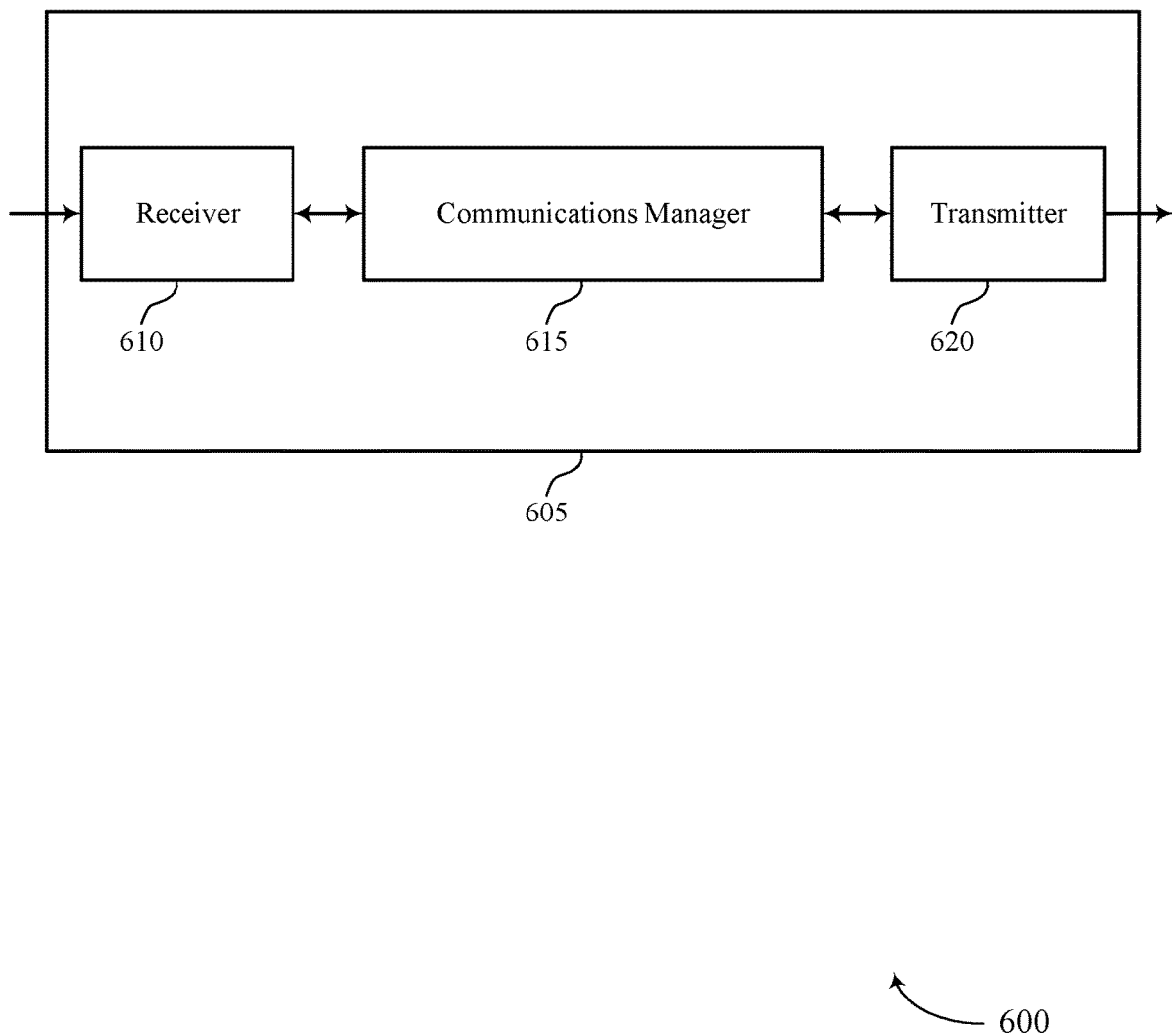
FIGS. 6 and 7 show block diagrams of devices that support machine learning model selection in beamformed communications in accordance with aspects of the present disclosure.

FIG. 6 shows a block diagram 600 of a device 605 that supports machine learning model selection in beamformed communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to machine learning model selection in beamformed communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may support wireless communication at a UE in accordance with examples as disclosed herein. For example, the communications manager 615 may be configured as or otherwise support a means for receiving, from a base station, one or more predictive models for at least a first function associated with beamformed communications with the base station. The communications manager 615 may be configured as or otherwise support a means for communicating with the base station using beamformed communications that are based on one or more parameters, the one or more parameters based on a predictive model of the one or more predictive models for the first function for beamformed communications with the base station.

The communications manager 615 may receive, from a base station, a set of predictive models for at least a first function associated with beamformed communications with the base station, select a first predictive model of the set of predictive models for the first function for beamformed communications with the base station, determine one or more parameters for the beamformed communications based on the first predictive model for the first function, and communicate with the base station using beamformed communications that are based on the one or more determined parameters. The communications manager 615 may be an example of aspects of the communications manager 910 described herein.

The communications manager 615 may as described herein be implemented to realize one or more potential aspects. One implementation may allow the device 605 to determine beamforming parameters more efficiently and accurately than would be the case if multiple iterations of beamforming parameters were to be used to tune various parameters, which may allow for efficient identification of parameters and communications. Further, implementations may provide the device 605 with lower latency and power consumption associated with identifying suitable beamforming parameters and conducting beamformed communications, among other aspects.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
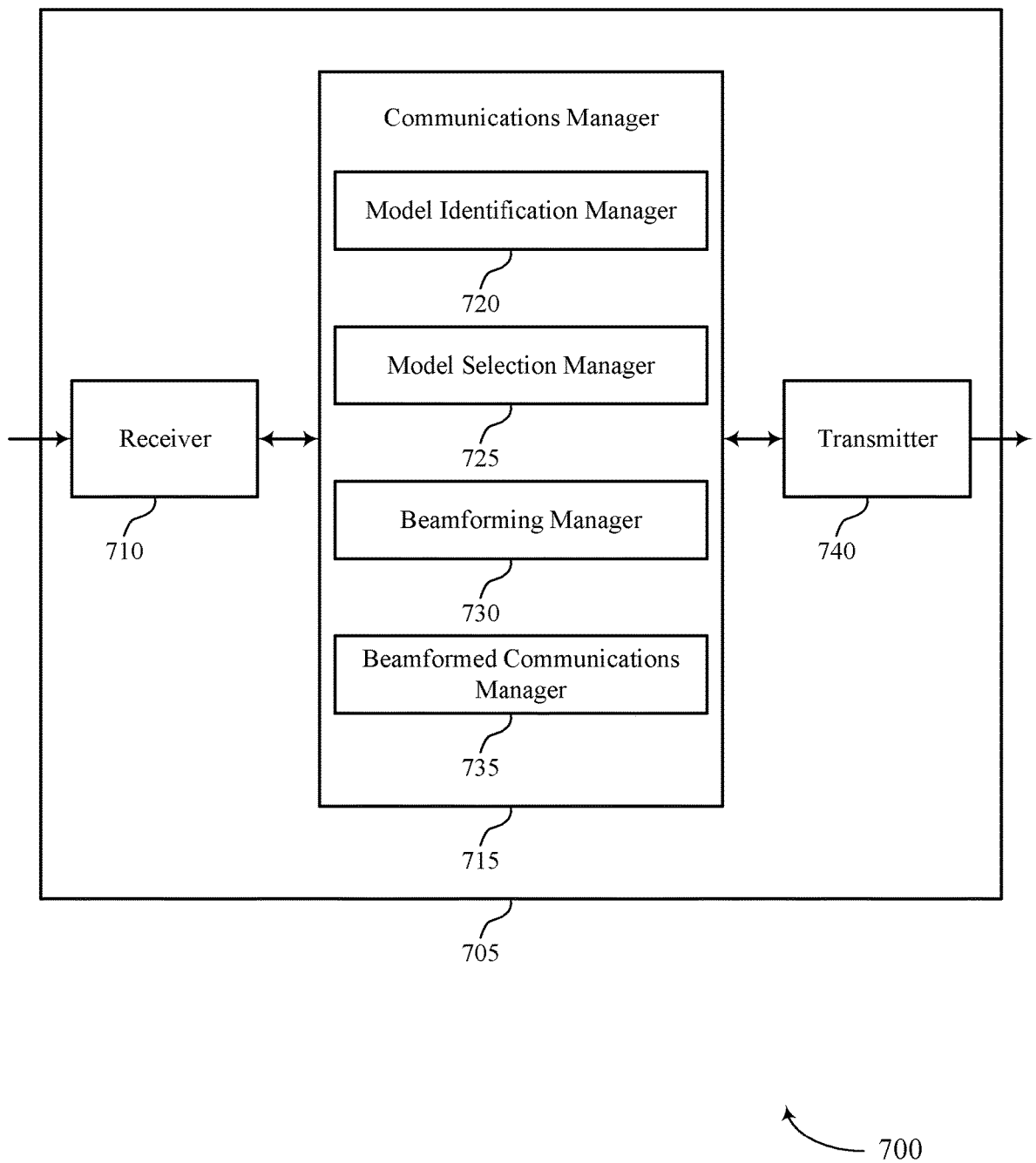

FIG. 7 shows a block diagram 700 of a device 705 that supports machine learning model selection in beamformed communications in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to machine learning model selection in beamformed communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a model identification manager 720, a model selection manager 725, a beamforming manager 730, and a beamformed communications manager 735. The communications manager 715 may be an example of aspects of the communications manager 910 described herein.

The communications manager 715 may support wireless communication at a UE in accordance with examples as disclosed herein. The model identification manager 720 may be configured as or otherwise support a means for receiving, from a base station, one or more predictive models for at least a first function associated with beamformed communications with the base station. The beamformed communications manager 735 may be configured as or otherwise support a means for communicating with the base station using beamformed communications that are based on one or more parameters, the one or more parameters based on a predictive model of the one or more predictive models for the first function for beamformed communications with the base station.

The model identification manager 720 may receive, from a base station, a set of predictive models for at least a first function associated with beamformed communications with the base station.

The model selection manager 725 may select a first predictive model of the set of predictive models for the first function for beamformed communications with the base station.

The beamforming manager 730 may determine one or more parameters for the beamformed communications based on the first predictive model for the first function.

The beamformed communications manager 735 may communicate with the base station using beamformed communications that are based on the one or more determined parameters.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
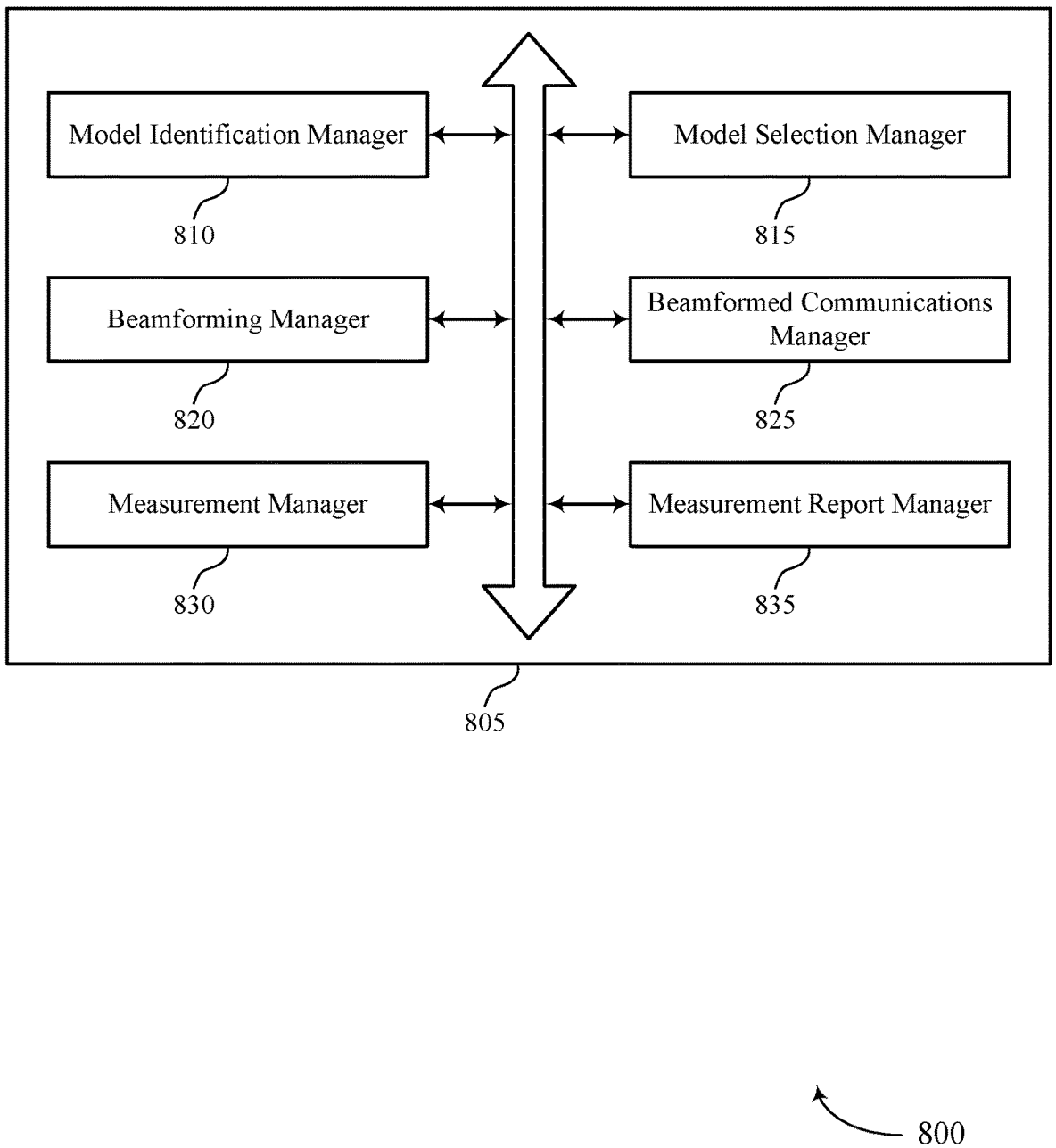
FIG. 8 shows a block diagram of a communications manager that supports machine learning model selection in beamformed communications in accordance with aspects of the present disclosure.

FIG. 8 shows a block diagram 800 of a communications manager 805 that supports machine learning model selection in beamformed communications in accordance with aspects of the present disclosure. The communications manager 805 may be an example of aspects of a communications manager 615, a communications manager 715, or a communications manager 910 described herein. The communications manager 805 may include a model identification manager 810, a model selection manager 815, a beamforming manager 820, a beamformed communications manager 825, a measurement manager 830, and a measurement report manager 835. Each of these modules may communicate, directly or indirectly, with one another (e.g., via one or more buses).

The communications manager 805 may support wireless communication at a UE in accordance with examples as disclosed herein. The model identification manager 810 may be configured as or otherwise support a means for receiving, from a base station, one or more predictive models for at least a first function associated with beamformed communications with the base station. The beamformed communications manager 825 may be configured as or otherwise support a means for communicating with the base station using beamformed communications that are based on one or more parameters, the one or more parameters based on a predictive model of the one or more predictive models for the first function for beamformed communications with the base station.

The model identification manager 810 may receive, from a base station, a set of predictive models for at least a first function associated with beamformed communications with the base station. In some cases, the UE receives, from the base station, a prioritized list of predictive models to be used at the UE for each of a set of functions associated with beamformed communications.

The model selection manager 815 may select a first predictive model of the set of predictive models for the first function for beamformed communications with the base station. In some examples, the model selection manager 815 may receive, from the base station, an indication of the first predictive model. In some examples, the model selection manager 815 may select the first predictive model for the first function responsive to the indication from the base station.

In some examples, the model selection manager 815 may determine whether the first predictive model accurately predicts the first function. In some examples, the model selection manager 815 may transmit an indication to the base station based on the determining.

In some examples, the model selection manager 815 may compute, for each of the set of predictive models, an outcome of the first function to generate a set of outcomes of the first function. In some examples, the model selection manager 815 may determine that a first outcome of the set of outcomes of the first function is a most preferred outcome of the set of outcomes, where the first outcome is associated with the first predictive model. In some examples, the model selection manager 815 may select the first predictive model based on the determining.

In some examples, the model selection manager 815 may monitor a prediction quality from the first predictive model over a set of predictions. In some examples, the model selection manager 815 may switch to a second predictive model for the first function based on the prediction quality from the first predictive model dropping below a threshold quality.

In some examples, the model selection manager 815 may receive, from the base station responsive to the one or more measurement reports, an indication to switch to a second predictive model of the set of predictive models. In some examples, the model selection manager 815 may receive, from the base station, a model selection function for selecting a different predictive model. In some examples, the model selection manager 815 may switch from the first predictive model to a second predictive model of the set of predictive models for the first function based on the model selection function. In some cases, the prediction quality dropping below the threshold quality determined based on an outcome of the first predictive model not matching an observed outcome based on one or more measurements at the UE. In some cases, the prediction quality dropping below the threshold quality is determined based on one or more of a number of consecutive incorrect predictions exceeding a threshold value, a number of incorrect predictions out of a set of past predictions exceeding the threshold value, or any combinations thereof.

The beamforming manager 820 may determine one or more parameters for the beamformed communications based on the first predictive model for the first function. In some examples, the beamforming manager 820 may determine one or more updated parameters for the further beamformed communications based on the second predictive model for the first function.

The beamformed communications manager 825 may communicate with the base station using beamformed communications that are based on the one or more determined parameters. In some examples, the beamformed communications manager 825 may communicate with the base station using beamformed communications that are based on the one or more updated parameters.

The measurement manager 830 may measure one or more channel conditions between the UE and the base station. In some examples, the measurement manager 830 may measure one or more reference signals received from the base station and one or more other base stations in one or more synchronization signal blocks (SSBs). In some examples, the measurement manager 830 may measure one or more channel conditions associated with the beamformed communications, one or more internal states of the UE, or combinations thereof, to identify a set of measurements. In some examples, the measurement manager 830 may provide the set of measurements as inputs to the model selection function, and where the switching is performed responsive to an associated output of the model selection function based on the set of measurements.

The measurement report manager 835 may transmit, responsive to the measuring, a measurement report to the base station that indicates the one or more channel conditions. In some examples, the measurement report manager 835 may transmit one or more measurement reports to the base station based on measurements associated with the beamformed communications that used the first predictive model for the first function. In some cases, the measurement report further indicates position information of the UE.

Figure 9:
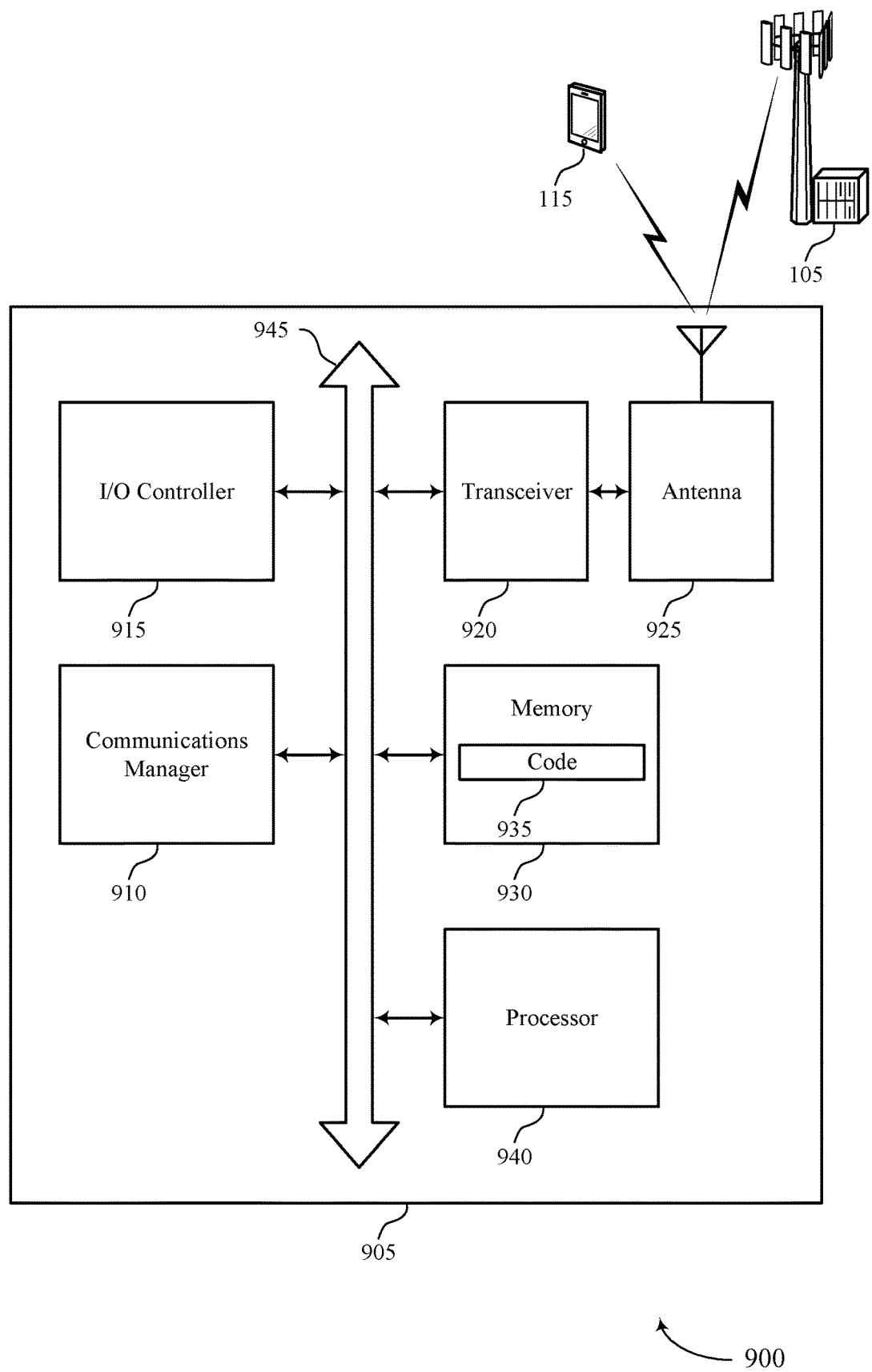
FIG. 9 shows a diagram of a system including a device that supports machine learning model selection in beamformed communications in accordance with aspects of the present disclosure.

FIG. 9 shows a diagram of a system 900 including a device 905 that supports machine learning model selection in beamformed communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may support wireless communication at a UE in accordance with examples as disclosed herein. For example, the communications manager 910 may be configured as or otherwise support a means for receiving, from a base station, one or more predictive models for at least a first function associated with beamformed communications with the base station. The communications manager 910 may be configured as or otherwise support a means for communicating with the base station using beamformed communications that are based on one or more parameters, the one or more parameters based on a predictive model of the one or more predictive models for the first function for beamformed communications with the base station.

The communications manager 910 may receive, from a base station, a set of predictive models for at least a first function associated with beamformed communications with the base station, select a first predictive model of the set of predictive models for the first function for beamformed communications with the base station, determine one or more parameters for the beamformed communications based on the first predictive model for the first function, and communicate with the base station using beamformed communications that are based on the one or more determined parameters.

The communications manager 910 may as described herein be implemented to realize one or more potential aspects. One implementation may allow the device 905 to determine beamforming parameters more efficiently and accurately than would be the case if multiple iterations of beamforming parameters were to be used to tune various parameters, which may allow for efficient identification of parameters and communications. Further, implementations may provide the device 905 with lower latency and power consumption associated with identifying suitable beamforming parameters and conducting beamformed communications, among other aspects.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting machine learning model selection in beamformed communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
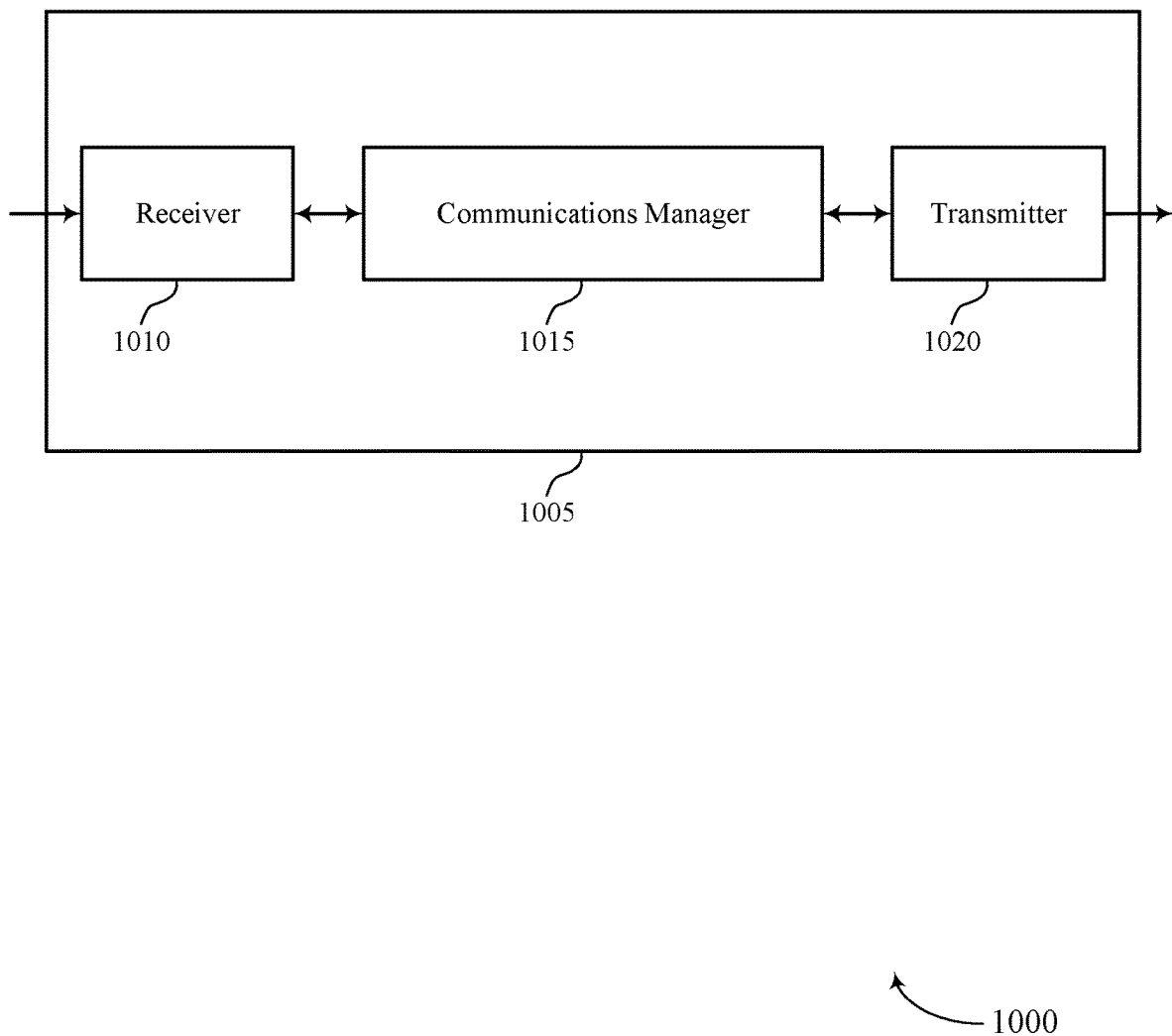
FIGS. 10 and 11 show block diagrams of devices that support machine learning model selection in beamformed communications in accordance with aspects of the present disclosure.

FIG. 10 shows a block diagram 1000 of a device 1005 that supports machine learning model selection in beamformed communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to machine learning model selection in beamformed communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may support wireless communication at a base station in accordance with examples as disclosed herein. For example, the communications manager 1015 may be configured as or otherwise support a means for transmitting, to a first UE, one or more predictive models for at least a first function associated with beamformed communications with the first UE, the one or more predictive models based on the first UE being identified for beamformed communications with the base station. The communications manager 1015 may be configured as or otherwise support a means for communicating with the first UE using beamformed communications parameters that are based on a predictive model of the one or more predictive models.

The communications manager 1015 may identify a set of predictive models for at least a first function associated with beamformed communications between the base station and a UE, transmit, to a first UE, the set of predictive models based on the first UE being identified for beamformed communications with the base station, and communicate with the first UE using beamformed communications that are based on one or more parameters of the first function that are determined based on a first predictive model of the set of predictive models. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
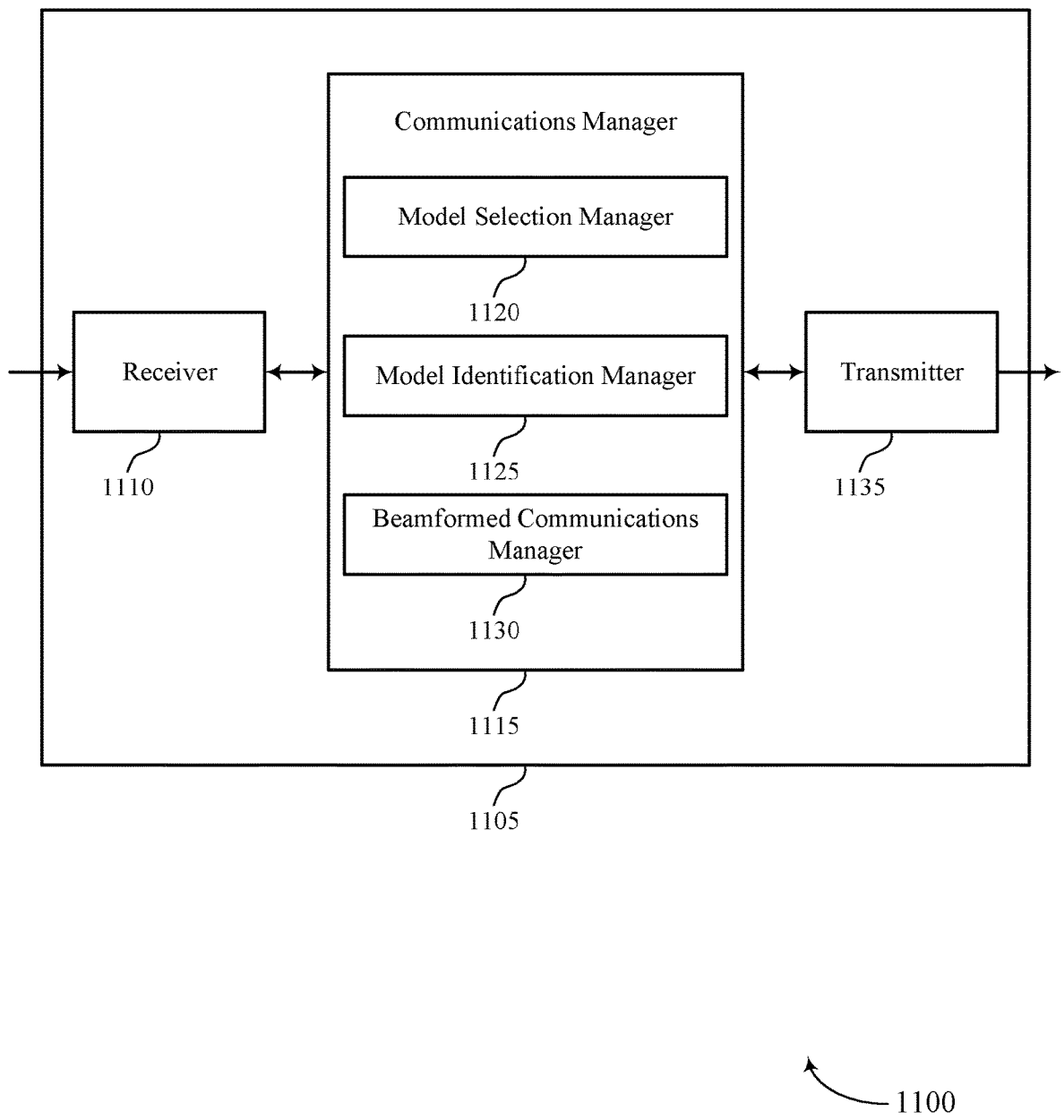

FIG. 11 shows a block diagram 1100 of a device 1105 that supports machine learning model selection in beamformed communications in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to machine learning model selection in beamformed communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a model selection manager 1120, a model identification manager 1125, and a beamformed communications manager 1130. The communications manager 1115 may be an example of aspects of the communications manager 1310 described herein.

The communications manager 1115 may support wireless communication at a base station in accordance with examples as disclosed herein. The model identification manager 1125 may be configured as or otherwise support a means for transmitting, to a first UE, one or more predictive models for at least a first function associated with beamformed communications with the first UE, the one or more predictive models based on the first UE being identified for beamformed communications with the base station. The beamformed communications manager 1130 may be configured as or otherwise support a means for communicating with the first UE using beamformed communications parameters that are based on a predictive model of the one or more predictive models.

The model selection manager 1120 may identify a set of predictive models for at least a first function associated with beamformed communications between the base station and a UE.

The model identification manager 1125 may transmit, to a first UE, the set of predictive models based on the first UE being identified for beamformed communications with the base station.

The beamformed communications manager 1130 may communicate with the first UE using beamformed communications that are based on one or more parameters of the first function that are determined based on a first predictive model of the set of predictive models.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
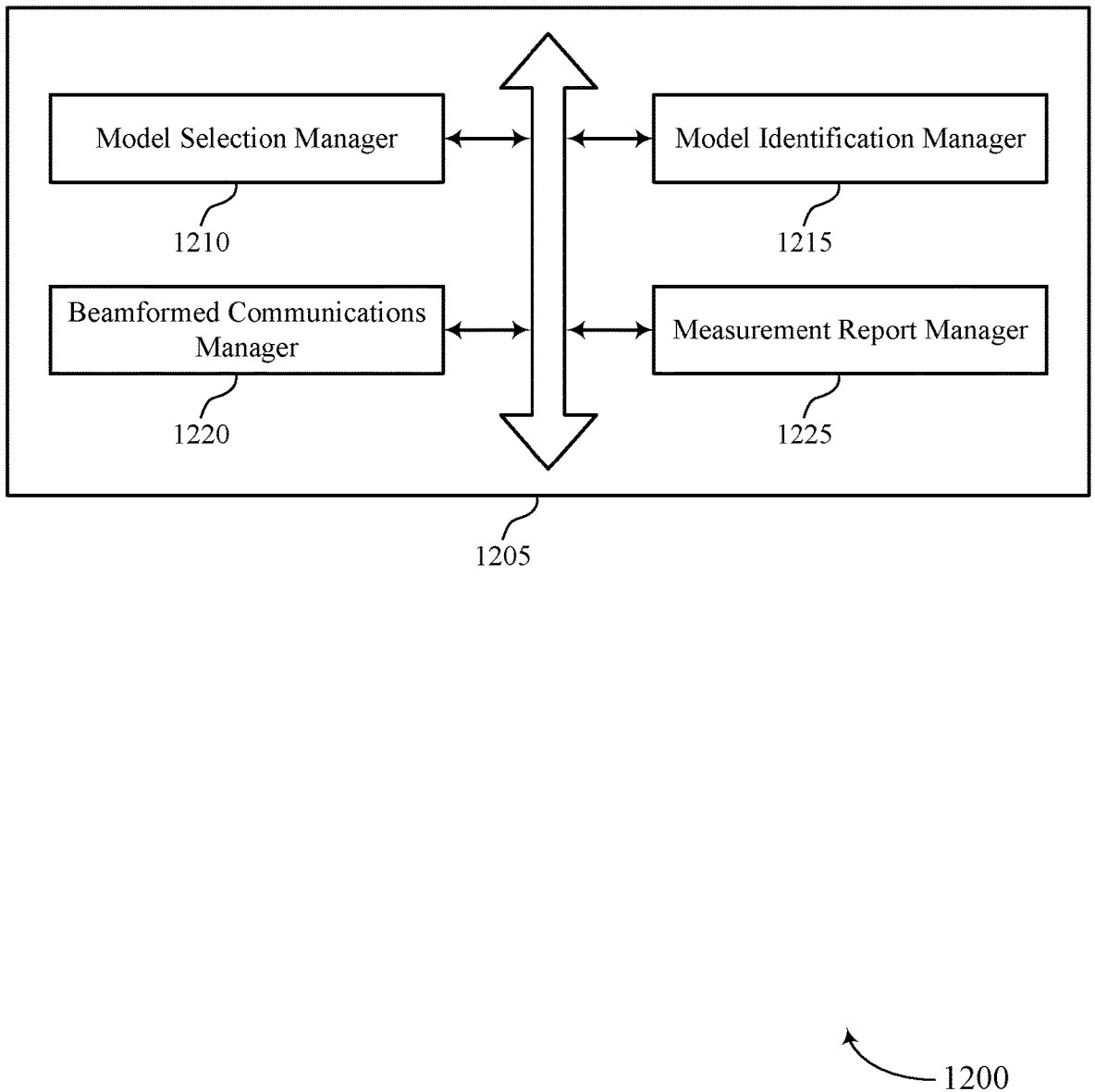
FIG. 12 shows a block diagram of a communications manager that supports machine learning model selection in beamformed communications in accordance with aspects of the present disclosure.

FIG. 12 shows a block diagram 1200 of a communications manager 1205 that supports machine learning model selection in beamformed communications in accordance with aspects of the present disclosure. The communications manager 1205 may be an example of aspects of a communications manager 1015, a communications manager 1115, or a communications manager 1310 described herein. The communications manager 1205 may include a model selection manager 1210, a model identification manager 1215, a beamformed communications manager 1220, and a measurement report manager 1225. Each of these modules may communicate, directly or indirectly, with one another (e.g., via one or more buses).

The communications manager 1205 may support wireless communication at a base station in accordance with examples as disclosed herein. The model identification manager 1215 may be configured as or otherwise support a means for transmitting, to a first UE, one or more predictive models for at least a first function associated with beamformed communications with the first UE, the one or more predictive models based on the first UE being identified for beamformed communications with the base station. The beamformed communications manager 1220 may be configured as or otherwise support a means for communicating with the first UE using beamformed communications parameters that are based on a predictive model of the one or more predictive models.

The model selection manager 1210 may identify a set of predictive models for at least a first function associated with beamformed communications between the base station and a UE. In some examples, the model selection manager 1210 may select, based on a measurement report, the first predictive model of the set of predictive models for the beamformed communications with the first UE. In some examples, the model selection manager 1210 may transmit, to the first UE, an indication of the first predictive model.

In some examples, the model selection manager 1210 may configure the first UE to select the first predictive model from the set of predictive models based on outcomes of the first function for each of the set of predictive models. In some examples, the model selection manager 1210 may configure a threshold prediction quality at the first UE to initiate a switch between predictive models. In some examples, the model selection manager 1210 may determine, based on the one or more measurement reports, that the first UE is to be switched to a second predictive model of the set of predictive models. In some examples, the model selection manager 1210 may transmit, to the UE, an indication to switch to the second predictive model.

In some examples, the model selection manager 1210 may transmit, to the first UE, a model selection function for UE selection of a different predictive model of the set of predictive models. In some cases, the threshold quality corresponds to a threshold value for a number of consecutive incorrect predictions, a number of incorrect predictions out of a set of past predictions exceeding the threshold value, or any combinations thereof.

The model identification manager 1215 may transmit, to a first UE, the set of predictive models based on the first UE being identified for beamformed communications with the base station. In some examples, the model identification manager 1215 may transmit a prioritized list of predictive models to be used at the first UE for each of a set of functions associated with the beamformed communications.

In some examples, the model identification manager 1215 may receive, from the first UE, an indication of whether the first predictive model accurately predicts the first function.

In some examples, the model identification manager 1215 may update a model for determining which of the set of predictive models to indicate to UEs based on measurement reports.

The beamformed communications manager 1220 may communicate with the first UE using beamformed communications that are based on one or more parameters of the first function that are determined based on a first predictive model of the set of predictive models.

The measurement report manager 1225 may receive, from the first UE, a measurement report that indicates one or more measured channel conditions at the first UE. In some examples, the measurement report manager 1225 may receive, from the first UE, one or more measurement reports indicating measurements associated with the beamformed communications that used the first predictive model for the first function. In some cases, the measurement report further indicates position information of the first UE, and where the selecting is further based on the position information.

Figure 13:
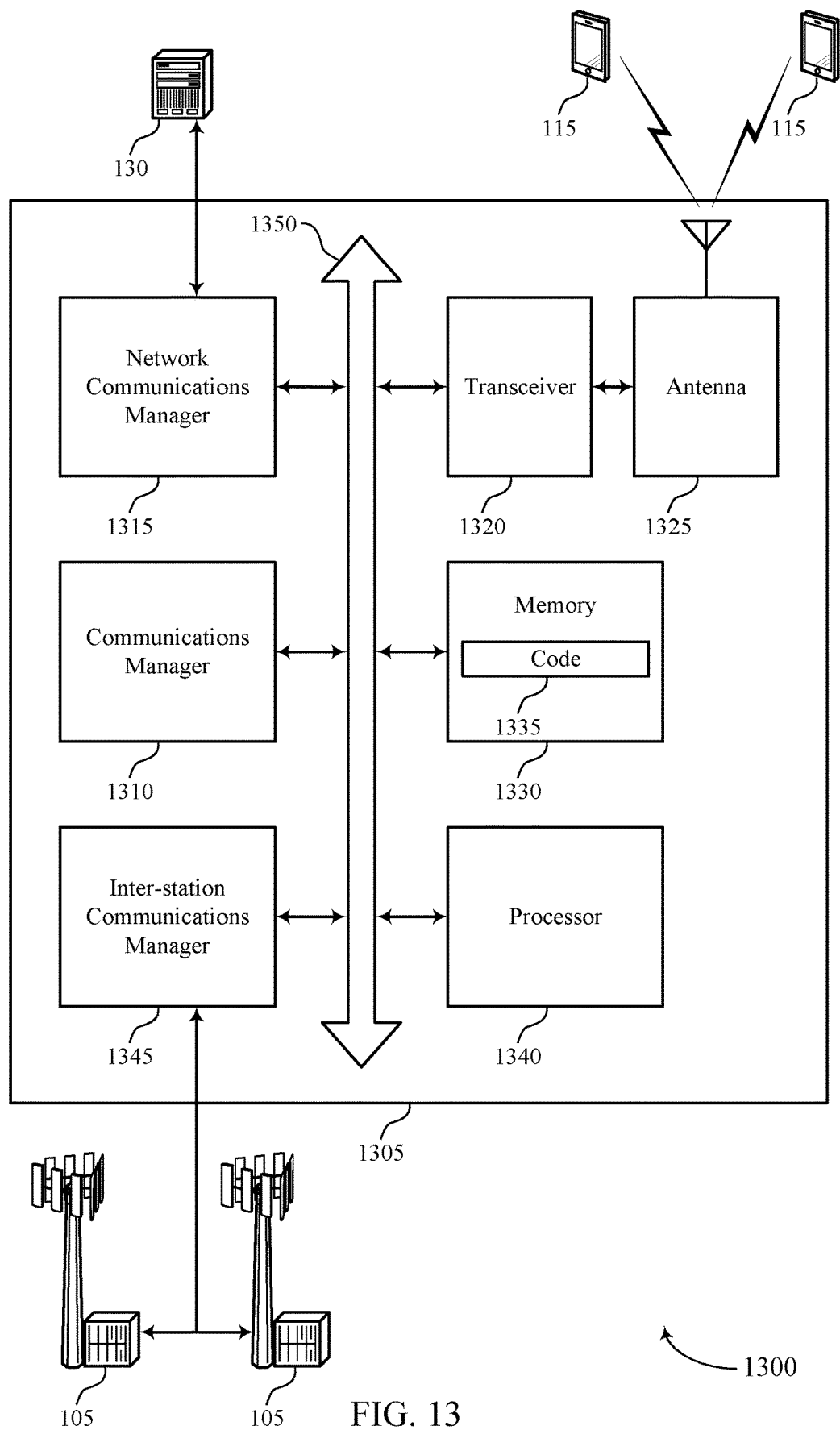
FIG. 13 shows a diagram of a system including a device that supports machine learning model selection in beamformed communications in accordance with aspects of the present disclosure.

FIG. 13 shows a diagram of a system 1300 including a device 1305 that supports machine learning model selection in beamformed communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may support wireless communication at a base station in accordance with examples as disclosed herein. For example, the communications manager 1310 may be configured as or otherwise support a means for transmitting, to a first UE, one or more predictive models for at least a first function associated with beamformed communications with the first UE, the one or more predictive models based on the first UE being identified for beamformed communications with the base station. The communications manager 1310 may be configured as or otherwise support a means for communicating with the first UE using beamformed communications parameters that are based on a predictive model of the one or more predictive models.

The communications manager 1310 may identify a set of predictive models for at least a first function associated with beamformed communications between the base station and a UE, transmit, to a first UE, the set of predictive models based on the first UE being identified for beamformed communications with the base station, and communicate with the first UE using beamformed communications that are based on one or more parameters of the first function that are determined based on a first predictive model of the set of predictive models.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting machine learning model selection in beamformed communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
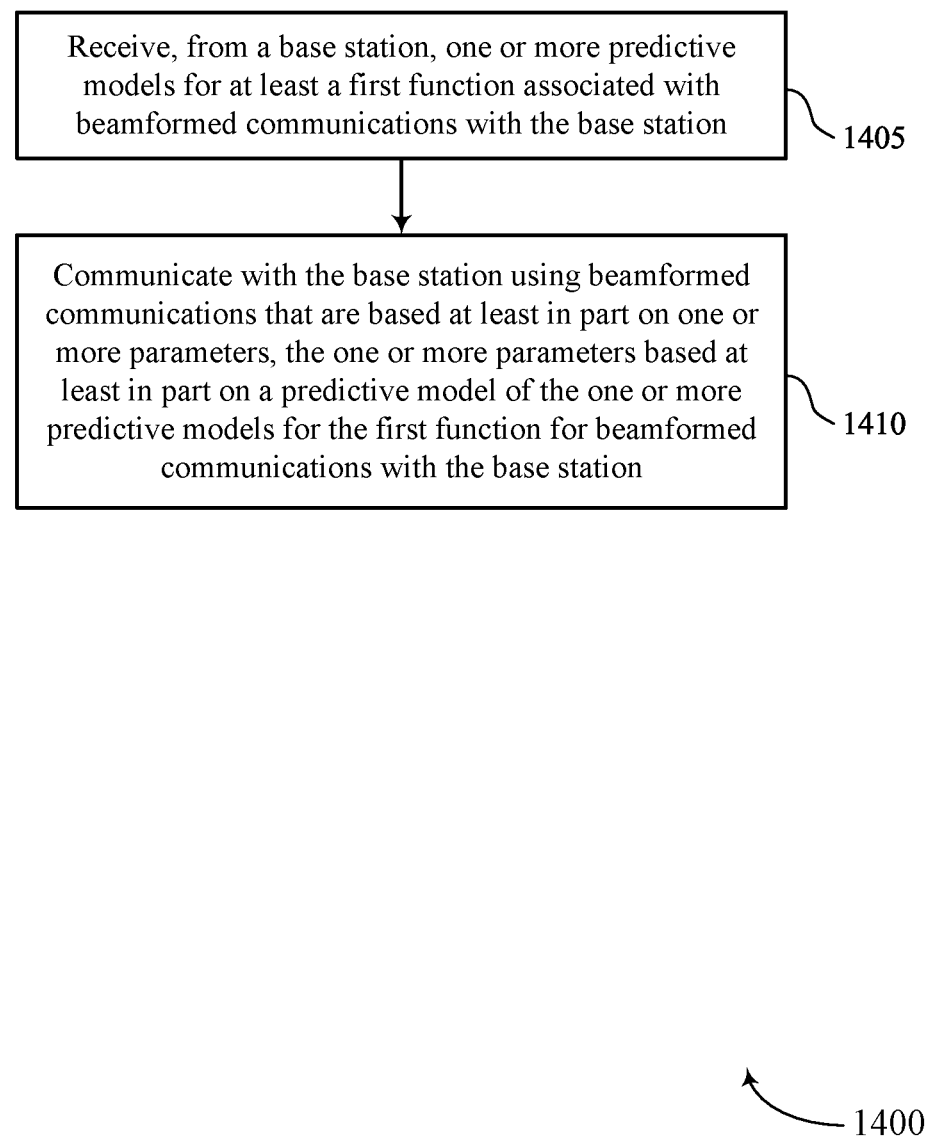
FIGS. 14 through 21 show flowcharts illustrating methods that support machine learning model selection in beamformed communications in accordance with aspects of the present disclosure.

FIG. 14 shows a flowchart illustrating a method 1400 that supports machine learning model selection in beamformed communications in accordance with aspects of the present disclosure. The operations of the method 1400 may be implemented by a UE or its components as described herein. For example, the operations of the method 1400 may be performed by a UE 115 as described with reference to FIGS. 6 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, one or more predictive models for at least a first function associated with beamformed communications with the base station. The operations of 1405 may be performed in accordance with examples as disclosed herein. In some examples, aspects of the operations of 1405 may be performed by a model identification manager as described with reference to FIGS. 6 through 9.

At 1410, the method may include communicating with the base station using beamformed communications that are based on one or more parameters, the one or more parameters based on a predictive model of the one or more predictive models for the first function for beamformed communications with the base station. The operations of 1410 may be performed in accordance with examples as disclosed herein. In some examples, aspects of the operations of 1410 may be performed by a beamformed communications manager as described with reference to FIGS. 6 through 9.

Figure 15:
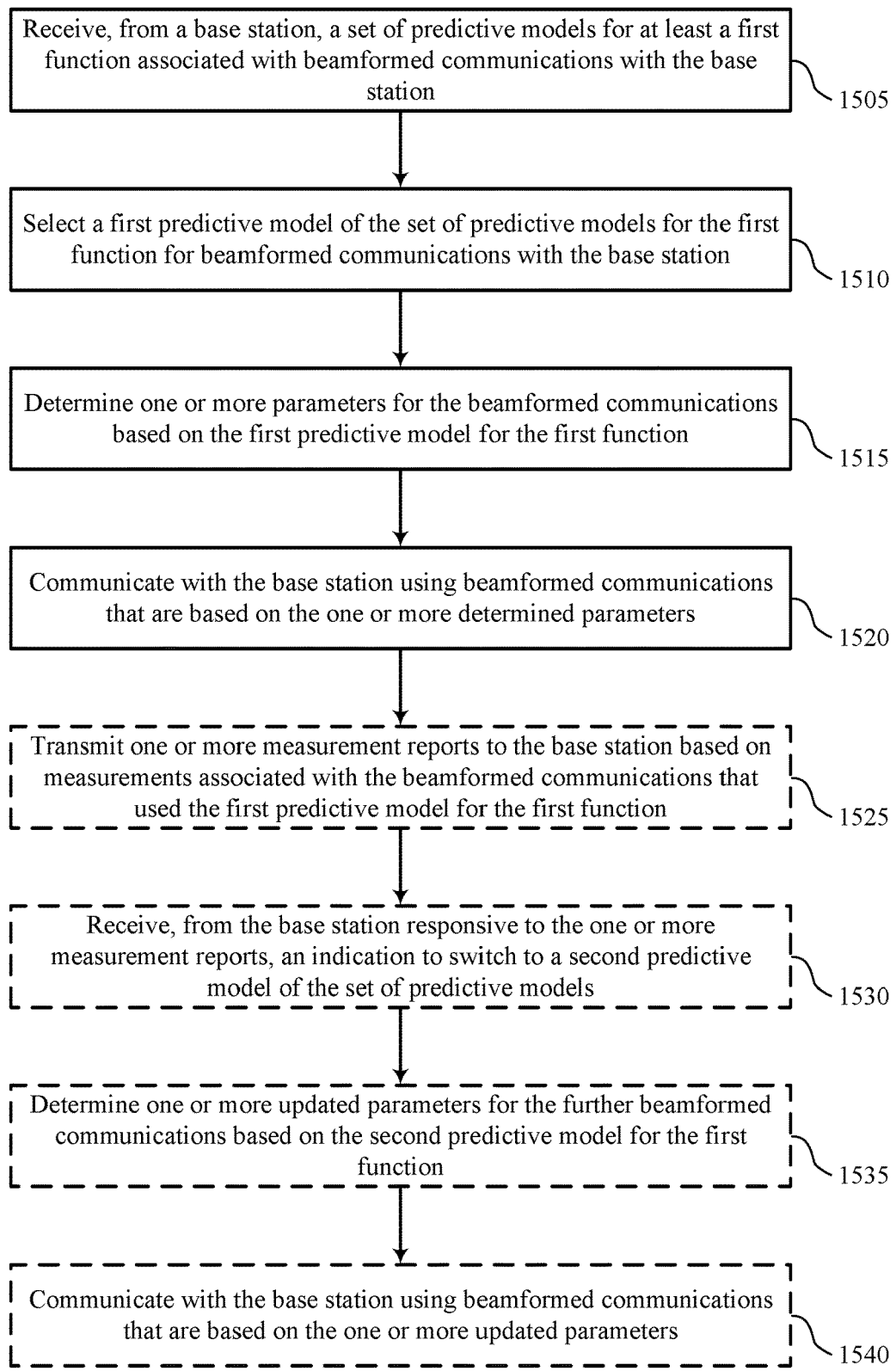

FIG. 15 shows a flowchart illustrating a method 1500 that supports machine learning model selection in beamformed communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a set of predictive models for at least a first function associated with beamformed communications with the base station. The operations of 1505 may be performed according to the methods described herein. In some examples, aspects of the operations of 1505 may be performed by a model identification manager as described with reference to FIGS. 6 through 9.

At 1510, the UE may select a first predictive model of the set of predictive models for the first function for beamformed communications with the base station. The operations of 1510 may be performed according to the methods described herein. In some examples, aspects of the operations of 1510 may be performed by a model selection manager as described with reference to FIGS. 6 through 9.

At 1515, the UE may determine one or more parameters for the beamformed communications based on the first predictive model for the first function. The operations of 1515 may be performed according to the methods described herein. In some examples, aspects of the operations of 1515 may be performed by a beamforming manager as described with reference to FIGS. 6 through 9.

At 1520, the UE may communicate with the base station using beamformed communications that are based on the one or more determined parameters. The operations of 1520 may be performed according to the methods described herein. In some examples, aspects of the operations of 1520 may be performed by a beamformed communications manager as described with reference to FIGS. 6 through 9.

Optionally, at 1525, the UE may transmit one or more measurement reports to the base station based on measurements associated with the beamformed communications that used the first predictive model for the first function. The operations of 1525 may be performed according to the methods described herein. In some examples, aspects of the operations of 1525 may be performed by a measurement report manager as described with reference to FIGS. 6 through 9.

Optionally, at 1530, the UE may receive, from the base station responsive to the one or more measurement reports, an indication to switch to a second predictive model of the set of predictive models. The operations of 1530 may be performed according to the methods described herein. In some examples, aspects of the operations of 1530 may be performed by a model selection manager as described with reference to FIGS. 6 through 9.

Optionally, at 1535, the UE may determine one or more updated parameters for the further beamformed communications based on the second predictive model for the first function. The operations of 1535 may be performed according to the methods described herein. In some examples, aspects of the operations of 1535 may be performed by a beamforming manager as described with reference to FIGS. 6 through 9.

Optionally, at 1540, the UE may communicate with the base station using beamformed communications that are based on the one or more updated parameters. The operations of 1540 may be performed according to the methods described herein. In some examples, aspects of the operations of 1540 may be performed by a beamformed communications manager as described with reference to FIGS. 6 through 9.

Figure 16:
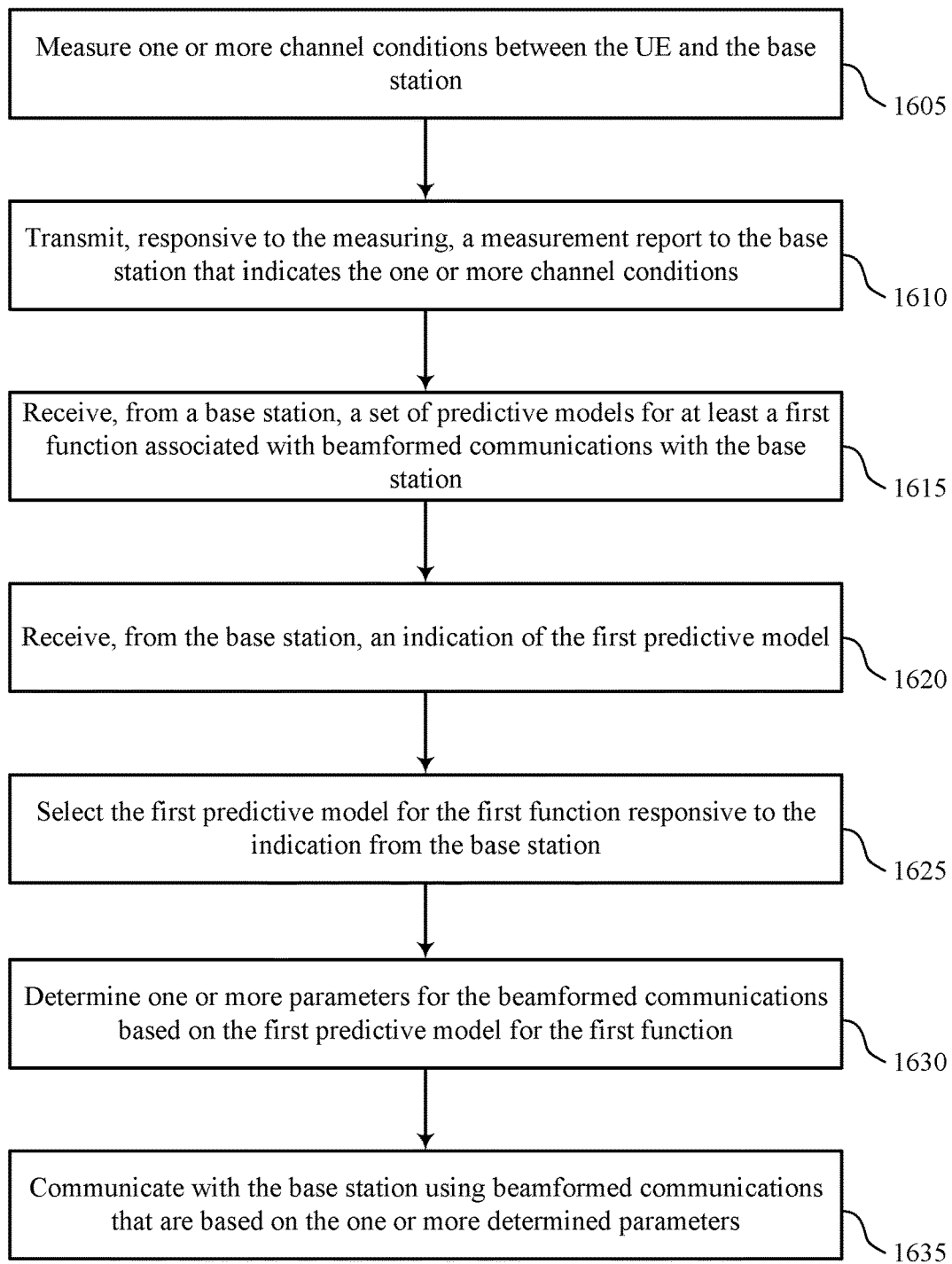

FIG. 16 shows a flowchart illustrating a method 1600 that supports machine learning model selection in beamformed communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may measure one or more channel conditions between the UE and the base station. The operations of 1605 may be performed according to the methods described herein. In some examples, aspects of the operations of 1605 may be performed by a measurement manager as described with reference to FIGS. 6 through 9.

At 1610, the UE may transmit, responsive to the measuring, a measurement report to the base station that indicates the one or more channel conditions. The operations of 1610 may be performed according to the methods described herein. In some examples, aspects of the operations of 1610 may be performed by a measurement report manager as described with reference to FIGS. 6 through 9.

At 1615, the UE may receive, from a base station, a set of predictive models for at least a first function associated with beamformed communications with the base station. The operations of 1615 may be performed according to the methods described herein. In some examples, aspects of the operations of 1615 may be performed by a model identification manager as described with reference to FIGS. 6 through 9.

At 1620, the UE may receive, from the base station, an indication of the first predictive model. The operations of 1620 may be performed according to the methods described herein. In some examples, aspects of the operations of 1620 may be performed by a model selection manager as described with reference to FIGS. 6 through 9.

At 1625, the UE may select the first predictive model for the first function responsive to the indication from the base station. The operations of 1625 may be performed according to the methods described herein. In some examples, aspects of the operations of 1625 may be performed by a model selection manager as described with reference to FIGS. 6 through 9.

At 1630, the UE may determine one or more parameters for the beamformed communications based on the first predictive model for the first function. The operations of 1630 may be performed according to the methods described herein. In some examples, aspects of the operations of 1630 may be performed by a beamforming manager as described with reference to FIGS. 6 through 9.

At 1635, the UE may communicate with the base station using beamformed communications that are based on the one or more determined parameters. The operations of 1635 may be performed according to the methods described herein. In some examples, aspects of the operations of 1635 may be performed by a beamformed communications manager as described with reference to FIGS. 6 through 9.

Figure 17:
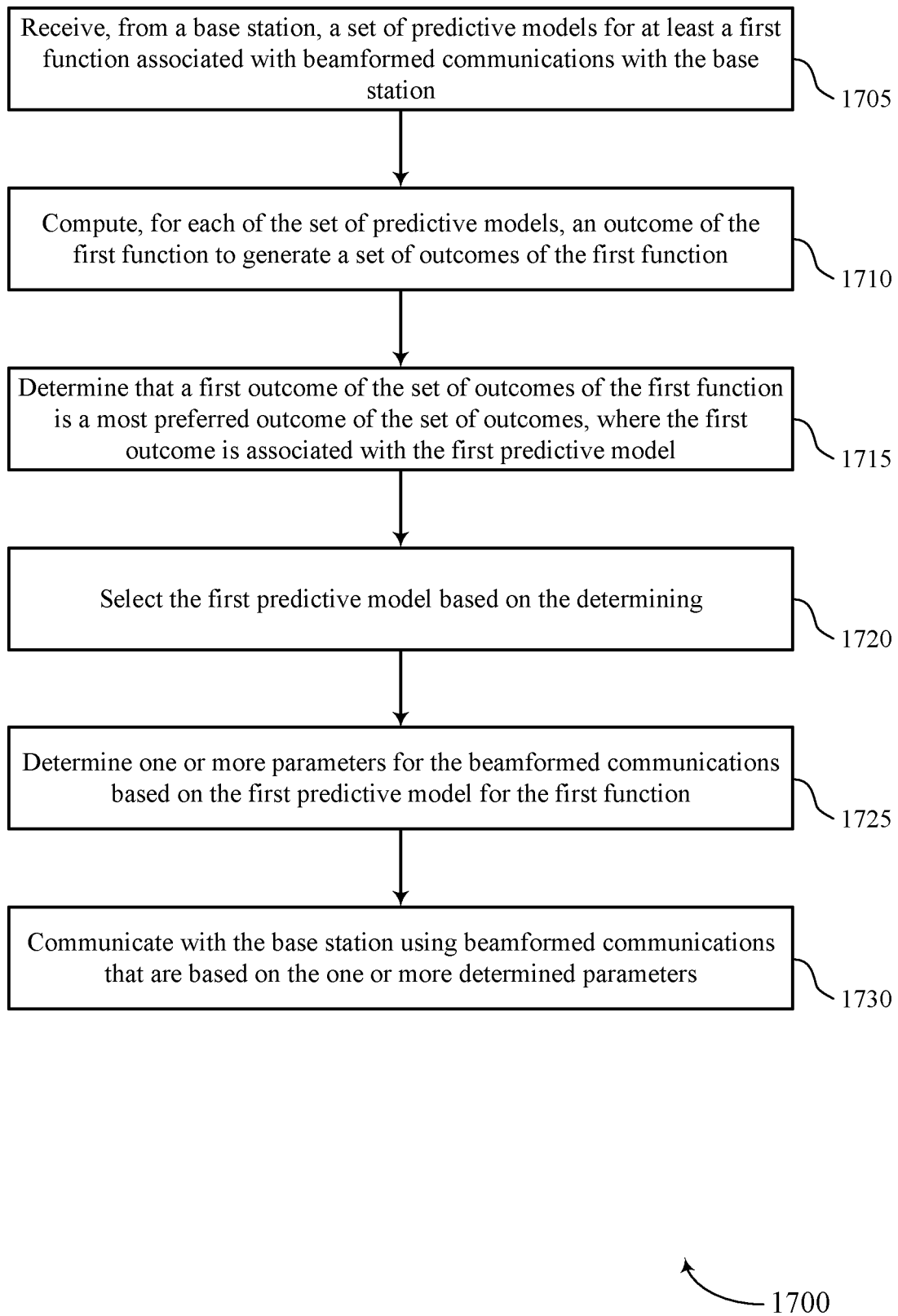

FIG. 17 shows a flowchart illustrating a method 1700 that supports machine learning model selection in beamformed communications in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a set of predictive models for at least a first function associated with beamformed communications with the base station. The operations of 1705 may be performed according to the methods described herein. In some examples, aspects of the operations of 1705 may be performed by a model identification manager as described with reference to FIGS. 6 through 9.

At 1710, the UE may compute, for each of the set of predictive models, an outcome of the first function to generate a set of outcomes of the first function. The operations of 1710 may be performed according to the methods described herein. In some examples, aspects of the operations of 1710 may be performed by a model selection manager as described with reference to FIGS. 6 through 9.

At 1715, the UE may determine that a first outcome of the set of outcomes of the first function is a most preferred outcome of the set of outcomes, where the first outcome is associated with the first predictive model. The operations of 1715 may be performed according to the methods described herein. In some examples, aspects of the operations of 1715 may be performed by a model selection manager as described with reference to FIGS. 6 through 9.

At 1720, the UE may select the first predictive model based on the determining. The operations of 1720 may be performed according to the methods described herein. In some examples, aspects of the operations of 1720 may be performed by a model selection manager as described with reference to FIGS. 6 through 9.

At 1725, the UE may determine one or more parameters for the beamformed communications based on the first predictive model for the first function. The operations of 1725 may be performed according to the methods described herein. In some examples, aspects of the operations of 1725 may be performed by a beamforming manager as described with reference to FIGS. 6 through 9.

At 1730, the UE may communicate with the base station using beamformed communications that are based on the one or more determined parameters. The operations of 1730 may be performed according to the methods described herein. In some examples, aspects of the operations of 1730 may be performed by a beamformed communications manager as described with reference to FIGS. 6 through 9.

Figure 18:
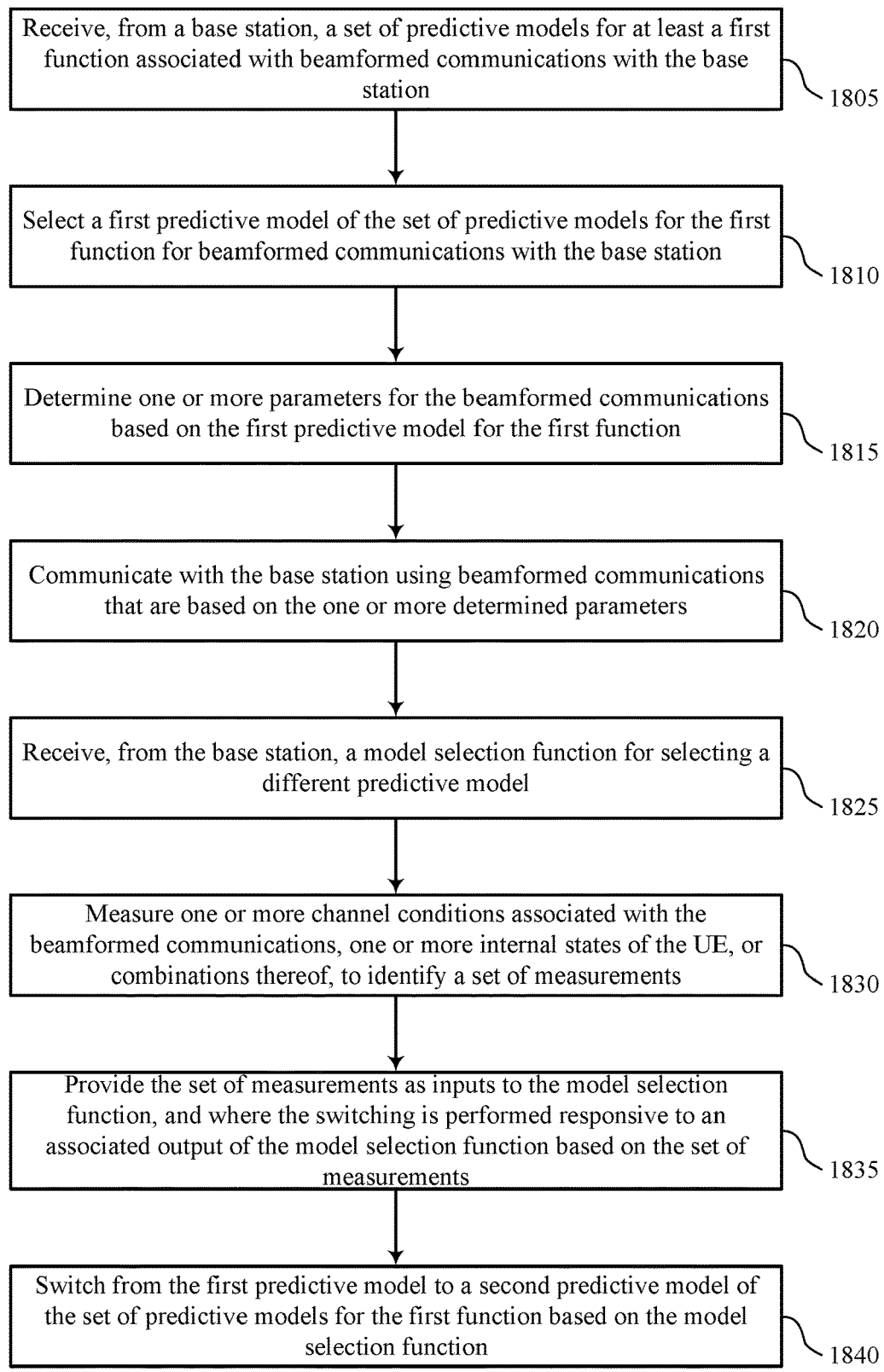

FIG. 18 shows a flowchart illustrating a method 1800 that supports machine learning model selection in beamformed communications in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a set of predictive models for at least a first function associated with beamformed communications with the base station. The operations of 1805 may be performed according to the methods described herein. In some examples, aspects of the operations of 1805 may be performed by a model identification manager as described with reference to FIGS. 6 through 9.

At 1810, the UE may select a first predictive model of the set of predictive models for the first function for beamformed communications with the base station. The operations of 1810 may be performed according to the methods described herein. In some examples, aspects of the operations of 1810 may be performed by a model selection manager as described with reference to FIGS. 6 through 9.

At 1815, the UE may determine one or more parameters for the beamformed communications based on the first predictive model for the first function. The operations of 1815 may be performed according to the methods described herein. In some examples, aspects of the operations of 1815 may be performed by a beamforming manager as described with reference to FIGS. 6 through 9.

At 1820, the UE may communicate with the base station using beamformed communications that are based on the one or more determined parameters. The operations of 1820 may be performed according to the methods described herein. In some examples, aspects of the operations of 1820 may be performed by a beamformed communications manager as described with reference to FIGS. 6 through 9.

At 1825, the UE may receive, from the base station, a model selection function for selecting a different predictive model. The operations of 1825 may be performed according to the methods described herein. In some examples, aspects of the operations of 1825 may be performed by a model selection manager as described with reference to FIGS. 6 through 9.

At 1830, the UE may measure one or more channel conditions associated with the beamformed communications, one or more internal states of the UE, or combinations thereof, to identify a set of measurements. The operations of 1830 may be performed according to the methods described herein. In some examples, aspects of the operations of 1830 may be performed by a measurement manager as described with reference to FIGS. 6 through 9.

At 1835, the UE may provide the set of measurements as inputs to the model selection function, and where the switching is performed responsive to an associated output of the model selection function based on the set of measurements. The operations of 1835 may be performed according to the methods described herein. In some examples, aspects of the operations of 1835 may be performed by a measurement manager as described with reference to FIGS. 6 through 9.

At 1840, the UE may switch from the first predictive model to a second predictive model of the set of predictive models for the first function based on the model selection function. The operations of 1840 may be performed according to the methods described herein. In some examples, aspects of the operations of 1840 may be performed by a model selection manager as described with reference to FIGS. 6 through 9.

Figure 19:
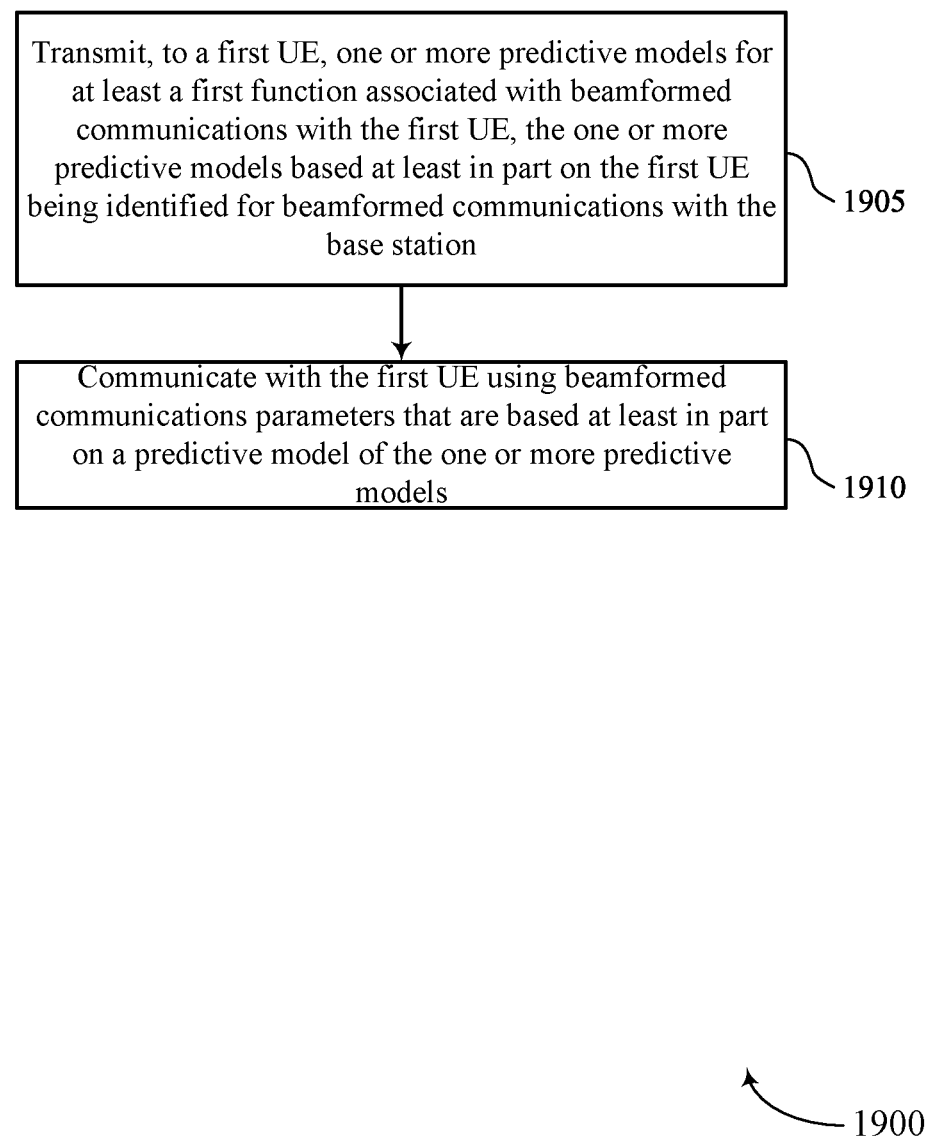

FIG. 19 shows a flowchart illustrating a method 1900 that supports machine learning model selection in beamformed communications in accordance with aspects of the present disclosure. The operations of the method 1900 may be implemented by a base station or its components as described herein. For example, the operations of the method 1900 may be performed by a base station 105 as described with reference to FIGS. 10 through 13. In some examples, a base station may execute a set of instructions to control the functional elements of the base station to perform the described functions. Additionally or alternatively, the base station may perform aspects of the described functions using special-purpose hardware.

At 1905, the method may include transmitting, to a first UE, one or more predictive models for at least a first function associated with beamformed communications with the first UE, the one or more predictive models based on the first UE being identified for beamformed communications with the base station. The operations of 1905 may be performed in accordance with examples as disclosed herein. In some examples, aspects of the operations of 1905 may be performed by a model identification manager as described with reference to FIGS. 10 through 13.

At 1910, the method may include communicating with the first UE using beamformed communications parameters that are based on a predictive model of the one or more predictive models. The operations of 1910 may be performed in accordance with examples as disclosed herein. In some examples, aspects of the operations of 1910 may be performed by a beamformed communications manager as described with reference to FIGS. 10 through 13.

Figure 20:
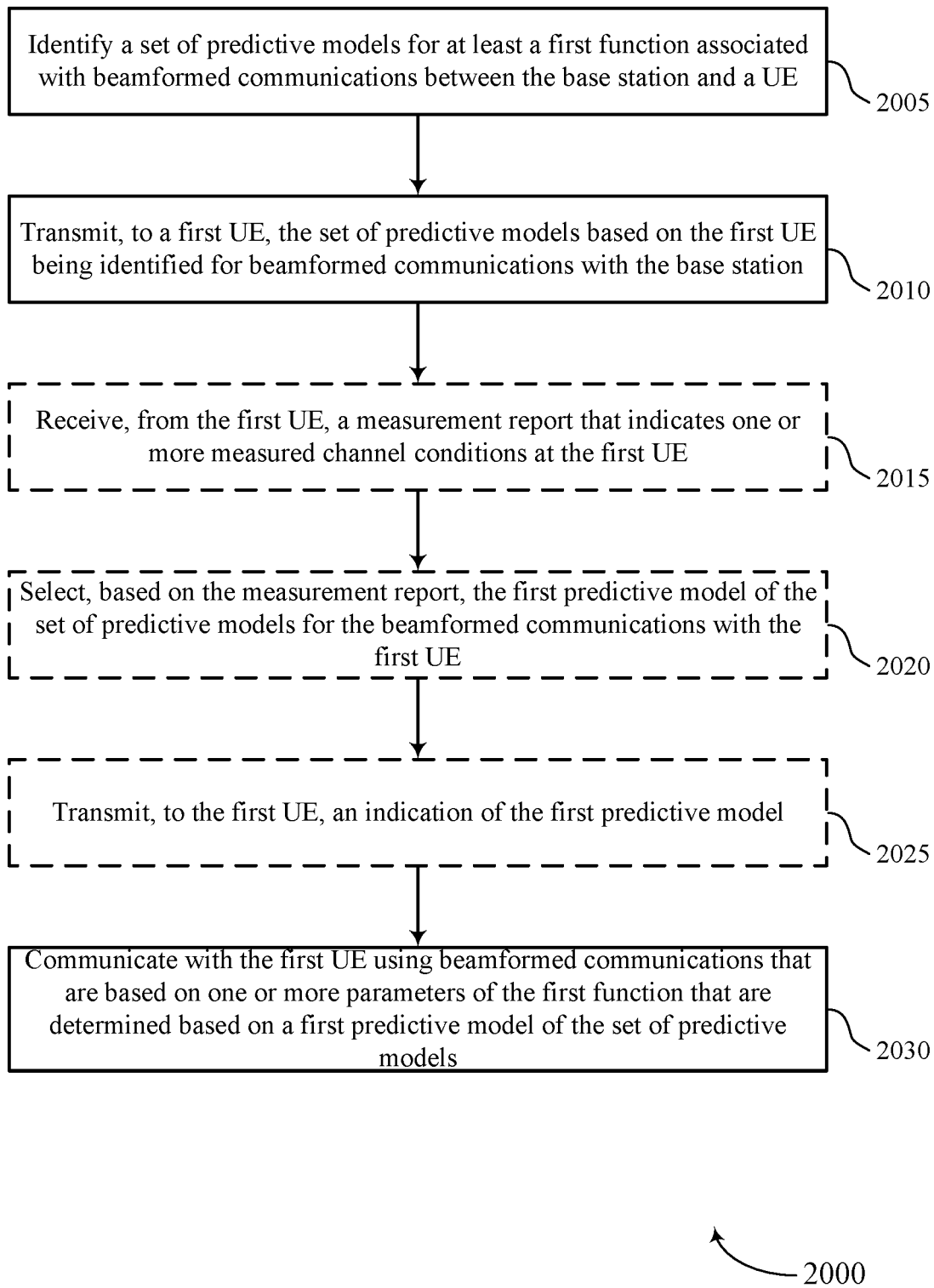

FIG. 20 shows a flowchart illustrating a method 2000 that supports machine learning model selection in beamformed communications in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may identify a set of predictive models for at least a first function associated with beamformed communications between the base station and a UE. The operations of 2005 may be performed according to the methods described herein. In some examples, aspects of the operations of 2005 may be performed by a model selection manager as described with reference to FIGS. 10 through 13.

At 2010, the base station may transmit, to a first UE, the set of predictive models based on the first UE being identified for beamformed communications with the base station. The operations of 2010 may be performed according to the methods described herein. In some examples, aspects of the operations of 2010 may be performed by a model identification manager as described with reference to FIGS. 10 through 13.

At 2015, the base station may receive, from the first UE, a measurement report that indicates one or more measured channel conditions at the first UE. The operations of 2015 may be performed according to the methods described herein. In some examples, aspects of the operations of 2015 may be performed by a measurement report manager as described with reference to FIGS. 10 through 13.

At 2020, the base station may select, based on the measurement report, the first predictive model of the set of predictive models for the beamformed communications with the first UE. The operations of 2020 may be performed according to the methods described herein. In some examples, aspects of the operations of 2020 may be performed by a model selection manager as described with reference to FIGS. 10 through 13.

At 2025, the base station may transmit, to the first UE, an indication of the first predictive model. The operations of 2025 may be performed according to the methods described herein. In some examples, aspects of the operations of 2025 may be performed by a model selection manager as described with reference to FIGS. 10 through 13.

At 2030, the base station may communicate with the first UE using beamformed communications that are based on one or more parameters of the first function that are determined based on a first predictive model of the set of predictive models. The operations of 2030 may be performed according to the methods described herein. In some examples, aspects of the operations of 2030 may be performed by a beamformed communications manager as described with reference to FIGS. 10 through 13.

Figure 21:
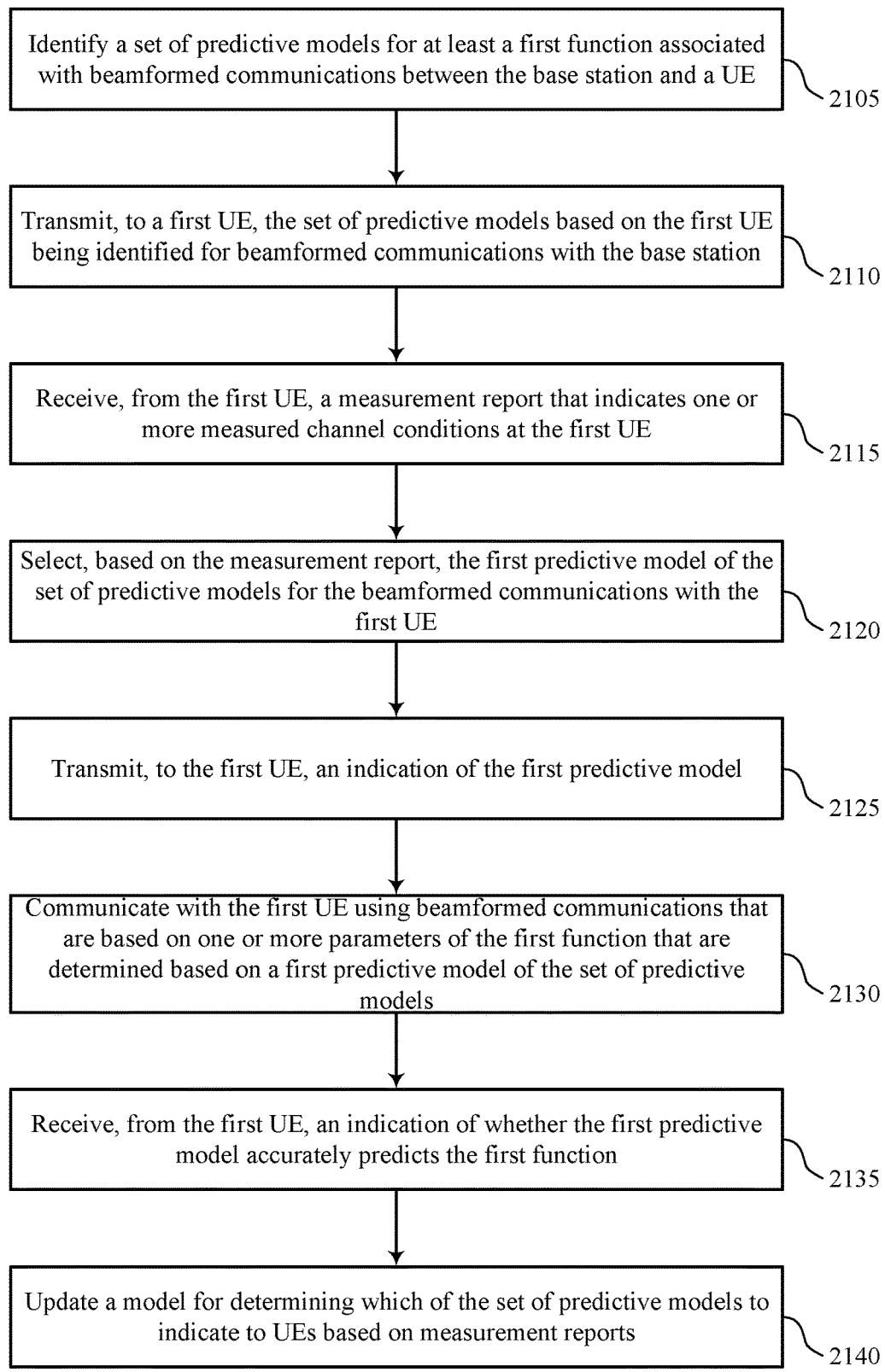

FIG. 21 shows a flowchart illustrating a method 2100 that supports machine learning model selection in beamformed communications in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station may identify a set of predictive models for at least a first function associated with beamformed communications between the base station and a UE. The operations of 2105 may be performed according to the methods described herein. In some examples, aspects of the operations of 2105 may be performed by a model selection manager as described with reference to FIGS. 10 through 13.

At 2110, the base station may transmit, to a first UE, the set of predictive models based on the first UE being identified for beamformed communications with the base station. The operations of 2110 may be performed according to the methods described herein. In some examples, aspects of the operations of 2110 may be performed by a model identification manager as described with reference to FIGS. 10 through 13.

At 2115, the base station may receive, from the first UE, a measurement report that indicates one or more measured channel conditions at the first UE. The operations of 2115 may be performed according to the methods described herein. In some examples, aspects of the operations of 2115 may be performed by a measurement report manager as described with reference to FIGS. 10 through 13.

At 2120, the base station may select, based on the measurement report, the first predictive model of the set of predictive models for the beamformed communications with the first UE. The operations of 2120 may be performed according to the methods described herein. In some examples, aspects of the operations of 2120 may be performed by a model selection manager as described with reference to FIGS. 10 through 13.

At 2125, the base station may transmit, to the first UE, an indication of the first predictive model. The operations of 2125 may be performed according to the methods described herein. In some examples, aspects of the operations of 2125 may be performed by a model selection manager as described with reference to FIGS. 10 through 13.

At 2130, the base station may communicate with the first UE using beamformed communications that are based on one or more parameters of the first function that are determined based on a first predictive model of the set of predictive models. The operations of 2130 may be performed according to the methods described herein. In some examples, aspects of the operations of 2130 may be performed by a beamformed communications manager as described with reference to FIGS. 10 through 13.

At 2135, the base station may receive, from the first UE, an indication of whether the first predictive model accurately predicts the first function. The operations of 2135 may be performed according to the methods described herein. In some examples, aspects of the operations of 2135 may be performed by a model identification manager as described with reference to FIGS. 10 through 13.

At 2140, the base station may update a model for determining which of the set of predictive models to indicate to UEs based on measurement reports. The operations of 2140 may be performed according to the methods described herein. In some examples, aspects of the operations of 2140 may be performed by a model identification manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a base station, one or more predictive models for at least a first function associated with beamformed communications with the base station; and communicating with the base station using beamformed communications that are based at least in part on one or more parameters, the one or more parameters based at least in part on a predictive model of the one or more predictive models for the first function for beamformed communications with the base station.

Aspect 2: The method of aspect 1, further comprising: measuring one or more channel conditions between the UE and the base station; transmitting, responsive to the measuring, a measurement report to the base station that indicates the one or more channel conditions; receiving, from the base station, an indication of the predictive model; and selecting the predictive model for the first function responsive to the indication from the base station.

Aspect 3: The method of aspect 2, wherein the UE receives, from the base station, a prioritized list of predictive models to be used at the UE for each of a plurality of functions associated with beamformed communications.

Aspect 4: The method of any of aspects 2 through 3, further comprising: determining whether the predictive model accurately predicts the first function; and transmitting an indication to the base station based on the determining.

Aspect 5: The method of any of aspects 2 through 4, wherein the measurement report further indicates position information of the UE.

Aspect 6: The method of any of aspects 2 through 5, wherein the measuring comprises: measuring one or more reference signals received from the base station and one or more other base stations in one or more synchronization signal blocks (SSBs).

Aspect 7: The method of any of aspects 1 through 6, further comprising: transmitting one or more measurement reports to the base station based on measurements associated with the beamformed communications that used the predictive model for the first function; receiving, from the base station responsive to the one or more measurement reports, an indication to switch to a different predictive model of the one or more predictive models; determining one or more updated parameters for the further beamformed communications based at least in part on the different predictive model for the first function; and communicating with the base station using beamformed communications that are based at least in part on the one or more updated parameters.

Aspect 8: The method of any of aspects 1 through 7, further comprising: receiving, from the base station, a model selection function for selecting a different predictive model; and switching to the different predictive model of the one or more predictive models for the first function based at least in part on the model selection function.

Aspect 9: The method of aspect 8, further comprising: measuring one or more channel conditions associated with the beamformed communications, one or more internal states of the UE, or combinations thereof, to identify a plurality of measurements; and providing the plurality of measurements as inputs to the model selection function, and wherein the switching is performed responsive to an associated output of the model selection function based on the plurality of measurements.

Aspect 10: The method of any of aspects 1 through 9, further comprising: computing, for each of two or more predictive models, an outcome of the first function to generate a two or more outcomes of the first function; determining that a first outcome of the two or more outcomes of the first function is a most preferred outcome, wherein the first outcome is associated with a first predictive model; and selecting the first predictive model based at least in part on the determining.

Aspect 11: The method of aspect 10, further comprising: monitoring a prediction quality from the first predictive model over a plurality of predictions; and switching to a second predictive model for the first function based at least in part on the prediction quality from the first predictive model dropping below a threshold quality.

Aspect 12: The method of aspect 11, wherein the prediction quality dropping below the threshold quality is determined based at least in part on an outcome of the first predictive model not matching an observed outcome based on one or more measurements at the UE.

Aspect 13: The method of any of aspects 11 through 12, wherein the prediction quality dropping below the threshold quality is determined based at least in part on one or more of a number of consecutive incorrect predictions exceeding a threshold value, a number of incorrect predictions out of a set of past predictions exceeding the threshold value, or any combinations thereof.

Aspect 14: A method for wireless communication at a base station, comprising: transmitting, to a first UE, one or more predictive models for at least a first function associated with beamformed communications with the first UE, the one or more predictive models based at least in part on the first UE being identified for beamformed communications with the base station; and communicating with the first UE using beamformed communications parameters that are based at least in part on a predictive model of the one or more predictive models.

Aspect 15: The method of aspect 14, further comprising: receiving, from the first UE, a measurement report that indicates one or more measured channel conditions at the first UE; selecting, based at least in part on the measurement report, the predictive model of the one or more predictive models for the beamformed communications with the first UE; and transmitting, to the first UE, an indication of the predictive model.

Aspect 16: The method of aspect 15, wherein the transmitting the indication of the predictive model comprises: transmitting a prioritized list of predictive models to be used at the first UE for each of a plurality of functions associated with the beamformed communications.

Aspect 17: The method of any of aspects 15 through 16, further comprising: receiving, from the first UE, an indication of whether the predictive model accurately predicts the first function; and updating a model for determining which of the one or more predictive models to indicate to UEs based on measurement reports.

Aspect 18: The method of any of aspects 15 through 17, wherein the measurement report further indicates position information of the first UE, and wherein the selecting is further based on the position information.

Aspect 19: The method of any of aspects 14 through 18, further comprising: receiving, from the first UE, one or more measurement reports indicating measurements associated with the beamformed communications that used the predictive model for the first function; determining, based at least in part on the one or more measurement reports, that the first UE is to be switched to a different predictive model of two or more predictive models; and transmitting, to the UE, an indication to switch to the different predictive model.

Aspect 20: The method of any of aspects 14 through 19, further comprising: transmitting, to the first UE, a model selection function for UE selection of a different predictive model.

Aspect 21: The method of any of aspects 14 through 20, further comprising: configuring the first UE to select the predictive model from two or more predictive models based on outcomes of the first function for each of the two or more predictive models.

Aspect 22: The method of aspect 21, wherein the configuring further comprises: configuring a threshold prediction quality at the first UE to initiate a switch between predictive models.

Aspect 23: The method of aspect 22, wherein the threshold prediction quality corresponds to a threshold value for a number of consecutive incorrect predictions, a number of incorrect predictions out of a set of past predictions exceeding the threshold value, or any combinations thereof.

Aspect 24: An apparatus for wireless communication at a base station, comprising a processor, memory coupled with the processor, the processor and memory configured to perform a method of any of aspects 1 through 13.

Aspect 25: An apparatus for wireless communication at a UE, comprising at least one means for performing a method of any of aspects 1 through 13.

Aspect 26: A non-transitory computer-readable medium storing code for wireless communication at a UE, the code comprising instructions executable by a processor to perform a method of any of aspects 1 through 13.

Aspect 27: An apparatus for wireless communication at a base station, comprising a processor, memory coupled with the processor, the processor and memory configured to perform a method of any of aspects 14 through 23.

Aspect 28: An apparatus for wireless communication at a base station, comprising at least one means for performing a method of any of aspects 14 through 23.

Aspect 29: A non-transitory computer-readable medium storing code for wireless communication at a base station, the code comprising instructions executable by a processor to perform a method of any of aspects 14 through 23.

Aspect 30: A method for wireless communication at a user equipment (UE), comprising: receiving, from a base station, a plurality of predictive models for at least a first function associated with beamformed communications with the base station; selecting a first predictive model of the plurality of predictive models for the first function for beamformed communications with the base station; determining one or more parameters for the beamformed communications based at least in part on the first predictive model for the first function; and communicating with the base station using beamformed communications that are based at least in part on the one or more determined parameters.

Aspect 31: The method of aspect 30, wherein the selecting comprises: measuring one or more channel conditions between the UE and the base station; transmitting, responsive to the measuring, a measurement report to the base station that indicates the one or more channel conditions; receiving, from the base station, an indication of the first predictive model; and selecting the first predictive model for the first function responsive to the indication from the base station.

Aspect 32: The method of any of aspects 30 or 31, wherein the UE receives, from the base station, a prioritized list of predictive models to be used at the UE for each of a plurality of functions associated with beamformed communications.

Aspect 33: The method of any of aspects 30 through 32, wherein the measuring comprises: measuring one or more reference signals received from the base station and one or more other base stations in one or more synchronization signal blocks (SSBs).

Aspect 34: The method of any of aspects 31 through 33, wherein the measurement report further indicates position information of the UE.

Aspect 35: The method of any of aspects 30 through 34, further comprising: determining whether the first predictive model accurately predicts the first function; and transmitting an indication to the base station based on the determining.

Aspect 36: The method of any of aspects 30 through 35, wherein the selecting comprises: computing, for each of the plurality of predictive models, an outcome of the first function to generate a plurality of outcomes of the first function; determining that a first outcome of the plurality of outcomes of the first function is a most preferred outcome of the plurality of outcomes, wherein the first outcome is associated with the first predictive model; and selecting the first predictive model based at least in part on the determining.

Aspect 37: The method of any of aspects 30 through 36, further comprising: monitoring a prediction quality from the first predictive model over a plurality of predictions; and switching to a second predictive model for the first function based at least in part on the prediction quality from the first predictive model dropping below a threshold quality.

Aspect 38: The method of aspect 37, wherein the prediction quality dropping below the threshold quality determined based at least in part on an outcome of the first predictive model not matching an observed outcome based on one or more measurements at the UE.

Aspect 39: The method of any of aspects 37 through 38, wherein the prediction quality dropping below the threshold quality is determined based at least in part on one or more of a number of consecutive incorrect predictions exceeding a threshold value, a number of incorrect predictions out of a set of past predictions exceeding the threshold value, or any combinations thereof.

Aspect 40: The method of any of aspects 30 through 39, further comprising: transmitting one or more measurement reports to the base station based on measurements associated with the beamformed communications that used the first predictive model for the first function; receiving, from the base station responsive to the one or more measurement reports, an indication to switch to a second predictive model of the plurality of predictive models; determining one or more updated parameters for the further beamformed communications based at least in part on the second predictive model for the first function; and communicating with the base station using beamformed communications that are based at least in part on the one or more updated parameters.

Aspect 41: The method of any of aspects 30 through 40, further comprising: receiving, from the base station, a model selection function for selecting a different predictive model; and switching from the first predictive model to a second predictive model of the plurality of predictive models for the first function based at least in part on the model selection function.

Aspect 42: The method of aspect 41, further comprising: measuring one or more channel conditions associated with the beamformed communications, one or more internal states of the UE, or combinations thereof, to identify a plurality of measurements; and providing the plurality of measurements as inputs to the model selection function, and wherein the switching is performed responsive to an associated output of the model selection function based on the plurality of measurements.

Aspect 43: An apparatus for wireless communications comprising at least one means for performing a method of any one of aspects 30 through 42.

Aspect 44: An apparatus for wireless communication comprising a processor, memory coupled with the processor, the processor and memory configured to cause the apparatus to perform a method of any one of aspects 30 through 42.

Aspect 45: A non-transitory computer-readable medium storing code for wireless communication comprising a processor, memory in electronic communication with the processor, and instructions stored in the memory and executable by the processor to cause the apparatus to perform a method of any one of aspects 30 through 42.

Aspect 46: A method for wireless communication at a base station, comprising: identifying a plurality of predictive models for at least a first function associated with beamformed communications between the base station and a UE;

transmitting, to a first UE, the plurality of predictive models based at least in part on the first UE being identified for beamformed communications with the base station; and communicating with the first UE using beamformed communications that are based at least in part on one or more parameters of the first function that are determined based on a first predictive model of the plurality of predictive models.

Aspect 47: The method of aspect 46, further comprising: receiving, from the first UE, a measurement report that indicates one or more measured channel conditions at the first UE; selecting, based at least in part on the measurement report, the first predictive model of the plurality of predictive models for the beamformed communications with the first UE; and transmitting, to the first UE, an indication of the first predictive model.

Aspect 48: The method of any of aspects 46 through 47, wherein the transmitting the indication of the first predictive model comprises: transmitting a prioritized list of predictive models to be used at the first UE for each of a plurality of functions associated with the beamformed communications.

Aspect 49: The method of any of aspects 46 through 48, wherein the measurement report further indicates position information of the first UE, and wherein the selecting is further based on the position information.

Aspect 50: The method of any of aspects 46 through 49, further comprising: receiving, from the first UE, an indication of whether the first predictive model accurately predicts the first function; and updating a model for determining which of the plurality of predictive models to indicate to UEs based on measurement reports.

Aspect 51: The method of any of aspects 46 through 50, further comprising: configuring the first UE to select the first predictive model from the plurality of predictive models based on outcomes of the first function for each of the plurality of predictive models.

Aspect 52: The method of any of aspects 46 through 51, wherein the configuring further comprises: configuring a threshold prediction quality at the first UE to initiate a switch between predictive models.

Aspect 53: The method of aspect 52, wherein the threshold quality corresponds to a threshold value for a number of consecutive incorrect predictions, a number of incorrect predictions out of a set of past predictions exceeding the threshold value, or any combinations thereof.

Aspect 54: The method of any of aspects 46 through 53, further comprising: receiving, from the first UE, one or more measurement reports indicating measurements associated with the beamformed communications that used the first predictive model for the first function; determining, based at least in part on the one or more measurement reports, that the first UE is to be switched to a second predictive model of the plurality of predictive models; and transmitting, to the UE, an indication to switch to the second predictive model.

Aspect 55: The method of any of aspects 46 through 54, further comprising: transmitting, to the first UE, a model selection function for UE selection of a different predictive model of the plurality of predictive models.

Aspect 56: An apparatus for wireless communications comprising at least one means for performing a method of any one of aspects 46 through 55.

Aspect 57: An apparatus for wireless communication comprising a processor, memory coupled with the processor, the processor and memory configured to cause the apparatus to perform a method of any one of aspects 46 through 55.

Aspect 58: A non-transitory computer-readable medium storing code for wireless communication comprising a processor, memory in electronic communication with the processor, and instructions stored in the memory and executable by the processor to cause the apparatus to perform a method of any one of aspects 46 through 55.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, two or more predictive models for at least a first function associated with beamformed communications with the base station; and
   communicating with the base station using beamformed communications that are based at least in part on one or more parameters, the one or more parameters based at least in part on a predictive model of the two or more predictive models for the first function for beamformed communications with the base station.

2. The method of claim 1, further comprising:
   measuring one or more channel conditions between the UE and the base station;
   transmitting, responsive to the measuring, a measurement report to the base station that indicates the one or more channel conditions;
   receiving, from the base station, an indication of the predictive model; and
   selecting the predictive model for the first function responsive to the indication from the base station.

3. The method of claim 2, wherein the UE receives, from the base station, a prioritized list of predictive models to be used at the UE for each of a plurality of functions associated with beamformed communications.

4. The method of claim 2, further comprising:
   determining whether the predictive model accurately predicts the first function; and
   transmitting an indication to the base station based on the determining.

5. The method of claim 2, wherein the measurement report further indicates position information of the UE.

6. The method of claim 2, wherein the measuring comprises:
   measuring one or more reference signals received from the base station and one or more other base stations in one or more synchronization signal blocks (SSBs).

7. The method of claim 1, further comprising:
   transmitting one or more measurement reports to the base station based on measurements associated with the beamformed communications that used the predictive model for the first function;
   receiving, from the base station responsive to the one or more measurement reports, an indication to switch to a different predictive model of the two or more predictive models;
   determining one or more updated parameters for further beamformed communications based at least in part on the different predictive model for the first function; and
   communicating with the base station using beamformed communications that are based at least in part on the one or more updated parameters.

8. The method of claim 1, further comprising:
   receiving, from the base station, a model selection function for selecting a different predictive model; and
   switching to the different predictive model of the two or more predictive models for the first function based at least in part on the model selection function.

9. The method of claim 8, further comprising:
   measuring one or more channel conditions associated with the beamformed communications, one or more internal states of the UE, or combinations thereof, to identify a plurality of measurements; and
   providing the plurality of measurements as inputs to the model selection function, and wherein the switching is performed responsive to an associated output of the model selection function based on the plurality of measurements.

10. The method of claim 1, further comprising:
    computing, for each of the two or more predictive models, an outcome of the first function to generate two or more outcomes of the first function;

determining that a first outcome of the two or more outcomes of the first function is a preferred outcome, wherein the first outcome is associated with a first predictive model; and selecting the first predictive model based at least in part on the determining.

11. The method of claim 10, further comprising:
monitoring a prediction quality from the first predictive model over a plurality of predictions; and
switching to a second predictive model for the first function based at least in part on the prediction quality from the first predictive model dropping below a threshold quality.

12. The method of claim 11, wherein the prediction quality dropping below the threshold quality is determined based at least in part on an outcome of the first predictive model not matching an observed outcome based on one or more measurements at the UE.

13. The method of claim 11, wherein the prediction quality dropping below the threshold quality is determined based at least in part on one or more of a number of consecutive incorrect predictions exceeding a threshold value, a number of incorrect predictions out of a set of past predictions exceeding the threshold value, or any combinations thereof.

14. A method for wireless communication at a base station, comprising:
transmitting, to a first UE, two or more predictive models for at least a first function associated with beamformed communications with the first UE, the two or more predictive models based at least in part on the first UE being identified for beamformed communications with the base station; and
communicating with the first UE using beamformed communications parameters that are based at least in part on a predictive model of the two one or more predictive models.

15. The method of claim 14, further comprising:
receiving, from the first UE, a measurement report that indicates one or more measured channel conditions at the first UE;
selecting, based at least in part on the measurement report, the predictive model of the two or more predictive models for the beamformed communications with the first UE; and
transmitting, to the first UE, an indication of the predictive model.

16. The method of claim 15, wherein the transmitting the indication of the predictive model comprises:
transmitting a prioritized list of predictive models to be used at the first UE for each of a plurality of functions associated with the beamformed communications.

17. The method of claim 15, further comprising:
receiving, from the first UE, an indication of whether the predictive model accurately predicts the first function; and
updating a model for determining which of the two or more predictive models to indicate to UEs based on measurement reports.

18. The method of claim 15, wherein the measurement report further indicates position information of the first UE, and wherein the selecting is further based on the position information.

19. The method of claim 14, further comprising:
receiving, from the first UE, one or more measurement reports indicating measurements associated with the beamformed communications that used the predictive model for the first function;
determining, based at least in part on the one or more measurement reports, that the first UE is to be switched to a different predictive model of the two or more predictive models; and
transmitting, to the first UE, an indication to switch to the different predictive model.

20. The method of claim 14, further comprising:
transmitting, to the first UE, a model selection function for UE selection of a different predictive model.

21. The method of claim 14, further comprising:
configuring the first UE to select the predictive model from the two or more predictive models based on outcomes of the first function for each of the two or more predictive models.

22. The method of claim 21, wherein the configuring further comprises:
configuring a threshold prediction quality at the first UE to initiate a switch between predictive models.

23. The method of claim 22, wherein the threshold prediction quality corresponds to a threshold value for a number of consecutive incorrect predictions, a number of incorrect predictions out of a set of past predictions exceeding the threshold value, or any combinations thereof.

24. An apparatus for wireless communication at a user equipment (UE), comprising:
a processor, and
memory coupled with the processor, the processor and memory configured to:
receive, from a base station, two or more predictive models for at least a first function associated with beamformed communications with the base station; and
communicate with the base station using beamformed communications that are based at least in part on one or more parameters, the one or more parameters based at least in part on a predictive model of the two or more predictive models for the first function for beamformed communications with the base station.

25. The apparatus of claim 24, further comprising:
an antenna coupled with the processor, and wherein the processor and memory are further configured to:
measure one or more channel conditions between the UE and the base station;
transmit, responsive to the measuring, a measurement report via the antenna to the base station that indicates the one or more channel conditions;
receive, via the antenna from the base station, an indication of the predictive model; and
select the predictive model for the first function responsive to the indication from the base station.

26. The apparatus of claim 25, wherein the processor and memory are further configured to:
receive, from the base station, a prioritized list of predictive models to be used at the UE for each of a plurality of functions associated with beamformed communications.

27. The apparatus of claim 25, wherein the processor and memory are further configured to:
determine whether the predictive model accurately predicts the first function; and
transmit an indication to the base station based on the determining.

28. An apparatus for wireless communication at a base station, comprising:
a processor, and memory coupled with the processor, the processor and memory configured to:
  transmit, to a first UE, two or more predictive models for at least a first function associated with beamformed communications with the first UE, the two or more predictive models based at least in part on the first UE being identified for beamformed communications with the base station; and
  communicate with the first UE using beamformed communications parameters that are based at least in part on a predictive model of the two one or more predictive models.

29. The apparatus of claim 28, further comprising:
an antenna coupled with the processor, and wherein the processor and memory are further configured to:
  receive, via the antenna from the first UE, a measurement report that indicates one or more measured channel conditions at the first UE;
  select, based at least in part on the measurement report, the predictive model of the two or more predictive models for the beamformed communications with the first UE; and
  transmit, via the antenna to the first UE, an indication of the predictive model.

30. The apparatus of claim 29, wherein the processor and memory are further configured to:
  transmit a prioritized list of predictive models to be used at the first UE for each of a plurality of functions associated with the beamformed communications.

31. A non-transitory computer-readable medium storing code for wireless communication at a user equipment (UE), the code comprising instructions executable by a processor to:
  receive, from a base station, two or more predictive models for at least a first function associated with beamformed communications with the base station; and
  communicate with the base station using beamformed communications that are based at least in part on one or more parameters, the one or more parameters based at least in part on a predictive model of the two or more predictive models for the first function for beamformed communications with the base station.

32. The non-transitory computer-readable medium of claim 31, wherein the instructions are further executable by the processor to:
  measure one or more channel conditions between the UE and the base station;
  transmit, responsive to the measured one or more channel conditions, a measurement report to the base station that indicates the one or more channel conditions;
  receive, from the base station, an indication of the predictive model; and
  select the predictive model for the first function responsive to the indication from the base station.

33. The non-transitory computer-readable medium of claim 32, wherein the instructions are further executable by the processor to:
  receive, from the base station, a prioritized list of predictive models to be used at the UE for each of a plurality of functions associated with beamformed communications.

34. The non-transitory computer-readable medium of claim 32, wherein the instructions are further executable by the processor to:
  determine whether the predictive model accurately predicts the first function; and
  transmit an indication to the base station based on the determination.

35. A non-transitory computer-readable medium storing code for wireless communication at a base station, the code comprising instructions executable by a processor to:
  transmit, to a first UE, two or more predictive models for at least a first function associated with beamformed communications with the first UE, the two or more predictive models based at least in part on the first UE being identified for beamformed communications with the base station; and
  communicate with the first UE using beamformed communications parameters that are based at least in part on a predictive model of the two or more predictive models.

36. The non-transitory computer-readable medium of claim 35, wherein the instructions are further executable by the processor to:
  receive, from the first UE, a measurement report that indicates one or more measured channel conditions at the first UE;
  select, based at least in part on the measurement report, the predictive model of the two or more predictive models for the beamformed communications with the first UE; and
  transmit, to the first UE, an indication of the predictive model.

37. The non-transitory computer-readable medium of claim 36, wherein the instructions are further executable by the processor to:
  transmit a prioritized list of predictive models to be used at the first UE for each of a plurality of functions associated with the beamformed communications.

38. The non-transitory computer-readable medium of claim 36, wherein the instructions are further executable by the processor to:
  receive, from the first UE, an indication of whether the predictive model accurately predicts the first function; and
  update a model for determining which of the two or more predictive models to indicate to UEs based on measurement reports.

* * * * *